US006381743B1

(12) United States Patent
Mutschler, III

(10) Patent No.: US 6,381,743 B1
(45) Date of Patent: *Apr. 30, 2002

(54) METHOD AND SYSTEM FOR GENERATING A HIERARCHIAL DOCUMENT TYPE DEFINITION FOR DATA INTERCHANGE AMONG SOFTWARE TOOLS

(75) Inventor: Eugene Otto Mutschler, III, San Clemente, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,230

(22) Filed: Mar. 31, 1999

(51) Int. Cl.[7] .................................................. G06F 9/45

(52) U.S. Cl. ........................ 717/104; 717/101; 717/108; 717/116; 717/137; 707/104.1

(58) Field of Search .................................. 717/101–104, 717/108, 114, 116, 137; 707/10, 103 R, 103 Y, 104.1, 513, 514; 709/315, 316

(56) References Cited

U.S. PATENT DOCUMENTS

| | | | | | |
|---|---|---|---|---|---|
| 5,445,575 A | * | 8/1995 | Lysakowski, Jr. | ......... | 707/104.1 |
| 5,970,490 A | * | 10/1999 | Morgenstern | ................ | 707/10 |
| 6,018,627 A | * | 1/2000 | Iyengar et al. | .............. | 717/103 |
| 6,023,579 A | * | 2/2000 | Hellgren et al. | ............ | 717/108 |
| 6,038,393 A | * | 3/2000 | Iyengar et al. | .............. | 717/104 |
| 6,167,564 A | * | 12/2000 | Fontana et al. | ............. | 717/104 |
| 6,170,081 B1 | * | 1/2001 | Fontana et al. | ............. | 717/104 |
| 6,253,366 B1 | * | 6/2001 | Mutschler, III | ............. | 717/104 |
| 6,289,501 B1 | * | 9/2001 | Mutschler, III | ............. | 717/104 |
| 6,292,932 B1 | * | 9/2001 | Baisley et al. | ............. | 717/114 |
| 6,343,265 B1 | * | 1/2002 | Glebov et al. | ................ | 703/25 |

OTHER PUBLICATIONS

Browne & Moore, "Reuse Library Interoperability and the World Wide Web," Proceedings of the 1997 symposium on Symposium on Software Reusability, SIGSOFT, ACM Press, 1997, pp. 182–189.*

Brodsky, S., "XMI Opens Application Interchange," IBM, sbrodsky@us.ibm.com, Mar. 30, 1999, pp. 1–12.*

\* cited by examiner

Primary Examiner—Tuan Q. Dam
(74) Attorney, Agent, or Firm—Alfred W. Kozak; Mark T. Starr; Lise A. Rode

(57) ABSTRACT

A method is disclosed for use in a software development framework having a repository and at least two software systems. The repository contains a meta-model and the software systems, which store instances of the meta-model. The method enables exchange of the instances of the metadata among the software systems using a generalized data transfer language. The method comprises the steps of extracting a fixed component and a list of repeated components of the metadata; extracting a variable component form the list of repeated components; parsing the variable component into a first set of constituent components for a first instance of the variable component; and, determining the hierarchical order and inheritance of the first set of constituent components in the list of repeated components. Next, each of the first set of constituent components are transformed into corresponding components of the generalized software language. The first instance of the variable component is then transformed into corresponding components of the generalized software language. The list of repeated components is updated and the previous five steps are repeated for another instance of the variable component. The list of repeated components are next transformed into corresponding components of the generalized software language. After this, the fixed components are transformed into corresponding components of the generalized software language. Finally, the corresponding components are distributed to the second instance of the software model.

19 Claims, 33 Drawing Sheets

METHOD AND SYSTEM FOR GENERATING A HIERARCHIAL DOCUMENT TYPE DEFINITION FOR DATA INTERCHANGE AMONG SOFTWARE TOOLS

CROSS REFERENCE TO RELATED APPLICATIONS

This patent document relates to the following patent applications, assigned to the same assignee hereof, which are incorporated herein by reference.

U.S. Ser. No. 09/282,345, now U.S. Pat. No. 6,289,501 B1, entitled A METHOD AND SYSTEM FOR GENERATING A SIMPLE DOCUMENT TYPE DEFINITION FOR DATA INTERCHANGE AMONG SOFTWARE TOOLS; and, U.S. Ser. No. 09/282,102, now U.S. Pat. No. 6,253,366 B1, entitled A METHOD AND SYSTEM FOR GENERATING A COMPACT DOCUMENT TYPE DEFINITION FOR DATA INTERCHANGE AMONG SOFTWARE TOOLS.

FIELD OF THE INVENTION

The present invention generally relates to the field of object-oriented programming; and, in particular to a method and system for enabling easy interchange of metadata among repositories and modeling tools implementing instances of meta models expressible in a meta object framework by using entities to reflect hierarchy in MOF meta models.

BACKGROUND OF THE INVENTION

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse and tool and technology models may be developed to manipulate the tool information in the repository. However, the transferring of data within models from tool to tool or from a tool to the repository has been a cumbersome and unyielding task for a long time.

Repository models typically contain classes, datatypes and messages. As more and more complex models are being built, the need arises for a method and system to transfer data in a model from place to place, e.g., to a tool that understands the UML ("Unified Modeling Language"). The present invention solves this problem by generating a data-transfer syntax in which a tool using a meta model can transport data from place to place. It is pointed out that the present invention is not limited to UML, but is applicable to a wide variety of languages.

The prefix "meta" as used herein shall describe a relationship. For example, "meta-data" describes data. In a similar fashion, a meta-object is an object that represents "meta-data"; and, "meta-model" means a model that defines an abstract language for expressing other models. A "meta-metamodel" means a model that defines an abstract language for expressing meta-models. The relationship between a meta-metamodel and a meta-model is analogous to the relationship between a meta-model and a model.

SUMMARY OF THE INVENTION

It is an object of the present invention to provide a method and system that enables ease of interchanging metadata between modeling tools and metadata repositories in distributed heterogeneous environments.

Another object of the present invention is to provide a method and system that allows developers of distributed systems the ability to share object models and other metadata over a network, including the Internet.

Yet another object of the present invention is to provide a method and system that allows metadata to be interchanged as streams or files with a standard format based on XML.

A feature of the present invention is the grouping of the entity objects into hierarchies that reflect the generalization hierarchy(s) in the meta-model.

Another feature of the present invention is the ability to keep a table of generated entity objects in order to re-use them and avoid duplicate entity generation.

Yet another feature of the present invention is the generation of entity objects for properties and behaviors of class objects in inheritance order, i.e. starting at the topmost classes in any inheritance hierarchy and proceeding downwards to avoid duplication of entities in case of multiple inheritance.

An advantage of the present invention is the prevention of duplication of properties and behavior of any object in the meta-model and the object itself thereby removing redundancy.

A method is disclosed for use in a software development framework having a repository and one or more software systems. The repository contains a meta-model and the software systems, which store instances of the meta-model. The method enables exchange of the instances of the meta-model among the software systems using a generalized data transfer language. The method comprises the steps of extracting a fixed component and a variable components of the meta-model; parsing the variable component into a first set of constituent components for a first instance of the variable component; extracting a list of repeated components from the constituent components, and determining the hierarchical order and inheritance of the members of the list of repeated components. Next, each of the repeated components is transformed into corresponding components of a generalized software language. Then, each of the first set of constituent components are transformed into corresponding components of the generalized software language. The first instance of the variable component is then transformed into corresponding components of the generalized software language. The previous six steps are repeated for a another instance of the variable component. After this, the fixed components are transformed into corresponding components of the generalized software language. Then, the corresponding components are distributed among the software systems. The generalized software language component can then be used to control the syntax of a generalized data transfer language to exchange the instance of the meta-model.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
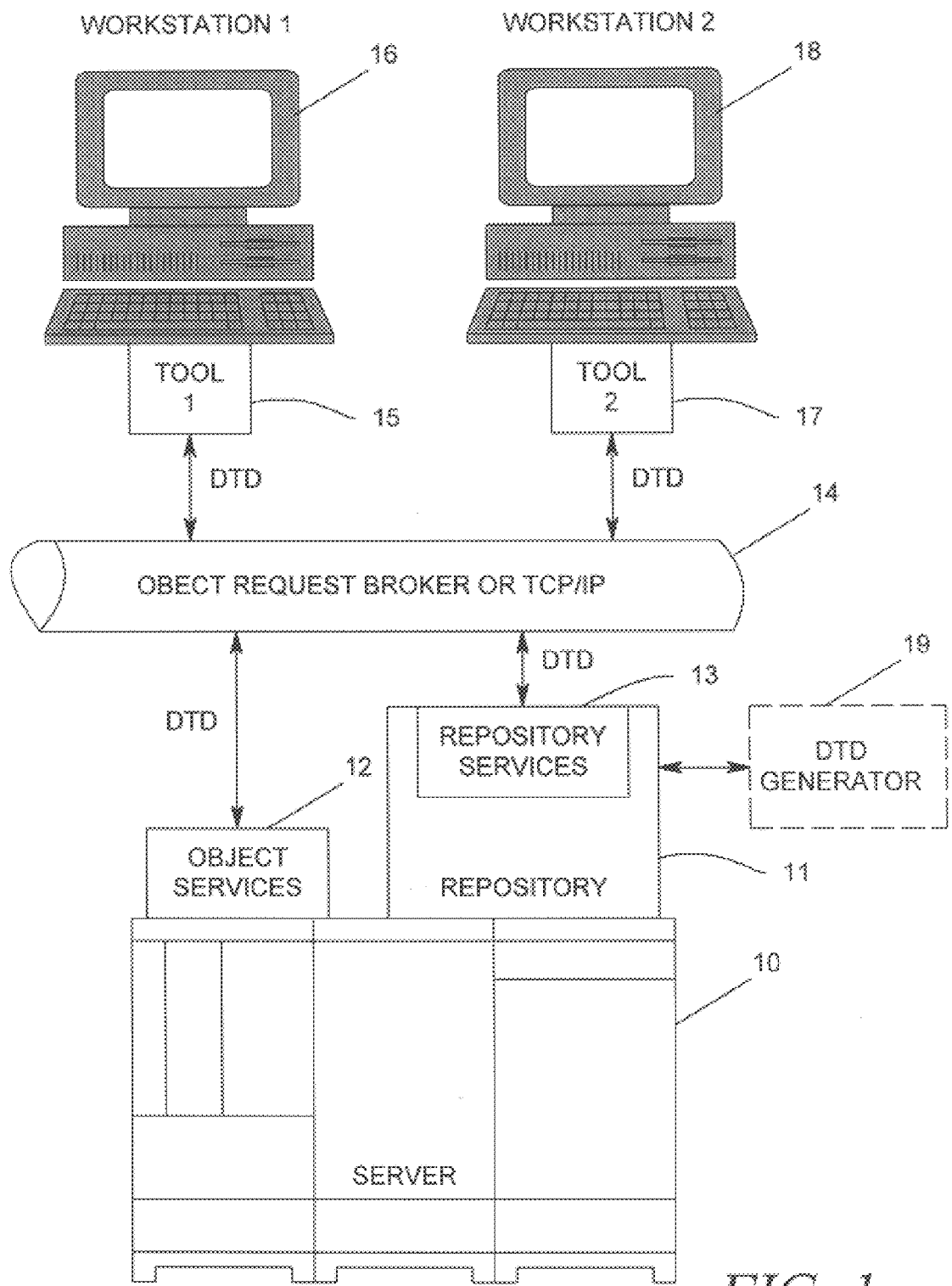
FIG. 1 is a block diagram of a system that my employ the method and system of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object.

For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

Users of workgroup-based and component development tools are finding it increasingly difficult to coordinate their software development efforts across the enterprise. A solution in accordance with the present invention employs the benefits of XMI (XML Metadata Interchange), which is an open industry standard that combines the benefits of the Web-based XML standard for defining, validating and sharing document formats on the Web with the Meta Object Framework (MOF) to provide means for generating formats to allow the development tools to share information. One particular use of the present invention is to define an XML DTD for the object-oriented Unified Modeling Language (UML). The XMI specification provides application developers with a common language for specifying transfer syntax for development language that allows visualizing, constructing and documenting of distributed objects and business models. The XMI specification in conjunction with the present invention will enable integration of development tools from multiple vendors, collaboration and distribution of object-oriented design and database schema information, and enhancement of the life cycle of information resources.

Software architectures based on meta models are transforming how one can design an architecture for dynamic distributed systems. The UML and MOF specifications establish a robust meta model architecture for distributed object applications. The XMI specification extends this architecture by leveraging technologies developed for the Web to exchange models between tools, applications and repositories.

In order to accomplish the objects of the present invention it is necessary to generate Document Type Definitions ("DTD") for the Extensible Markup Language ("XML"), a World Wide Web Consortium standard. A DTD is a set of rules governing the element types that are allowed within an XML document and rules specifying the allowed content and attributes of each element type. The DTD also declares all the external entities referenced within the document and the notations that can be used. Stated otherwise, an XML DTD provides a means by which an XML processor can validate the syntax and some of the semantics of an XML document. An XMI DTD specifies the particular elements allowed in an XMI document.

The present invention describes algorithms for generating an XMI DTD for any valid meta model defined in a MOF-compliant repository. Referring now to FIG. 1 a block diagram of the system that may employ the present invention is shown. A server 10 executes a variety of software including a repository 11 and object services 12. The repository 11 includes a set of repository services 13, which also couple the repository to an object request broker ("ORB") 14. The object services 12 also couples the server to the ORB 14. It is noted that a TCP/IP connection will suffice in lieu of the ORB 14. A first tool 15, which is being executed by a first workstation 16, is coupled to the ORB 14. In a similar manner, a second tool 17, which is being executed by a second workstation 18, is also coupled to the ORB 14. As will be explained in greater detail hereinbelow, the present invention includes a DTD generator 19, which effects data interchange among the tools 15 and 17 and the repository 11 by defining the contents of the messages exchanged. The DTD generator 19 is illustrated in dashed lines to denote the fact that it appears earlier in time than the transfer of data in which it is used. That is, the DTD is first generated then it is subsequently employed for communication by the repository 11 with the tools 15 and 17.

In the disclosed embodiment, the repository 11 is a specialized, extensible object-oriented database application that adds value to a database system, which allows customization of a particular domain (such as application development).

The repository 11 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++PROGRAMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, now U.S. Pat. No. 6,105,073, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, now U.S. Pat. No. 6,018,627, for TOOL-INDEPENDENT APPLICATION DEVELOPMENT; and, pending application Ser. No. 08/934,834, filed on Sep. 22, 1997, now U.S. Pat. No. 6,038,343, for EXCHANGING INFORMATION BETWEEN DIFFERENT OBJECT MODELS AND UML; each of which are hereby incorporated by reference as if set forth in full herein.

Figure 2:
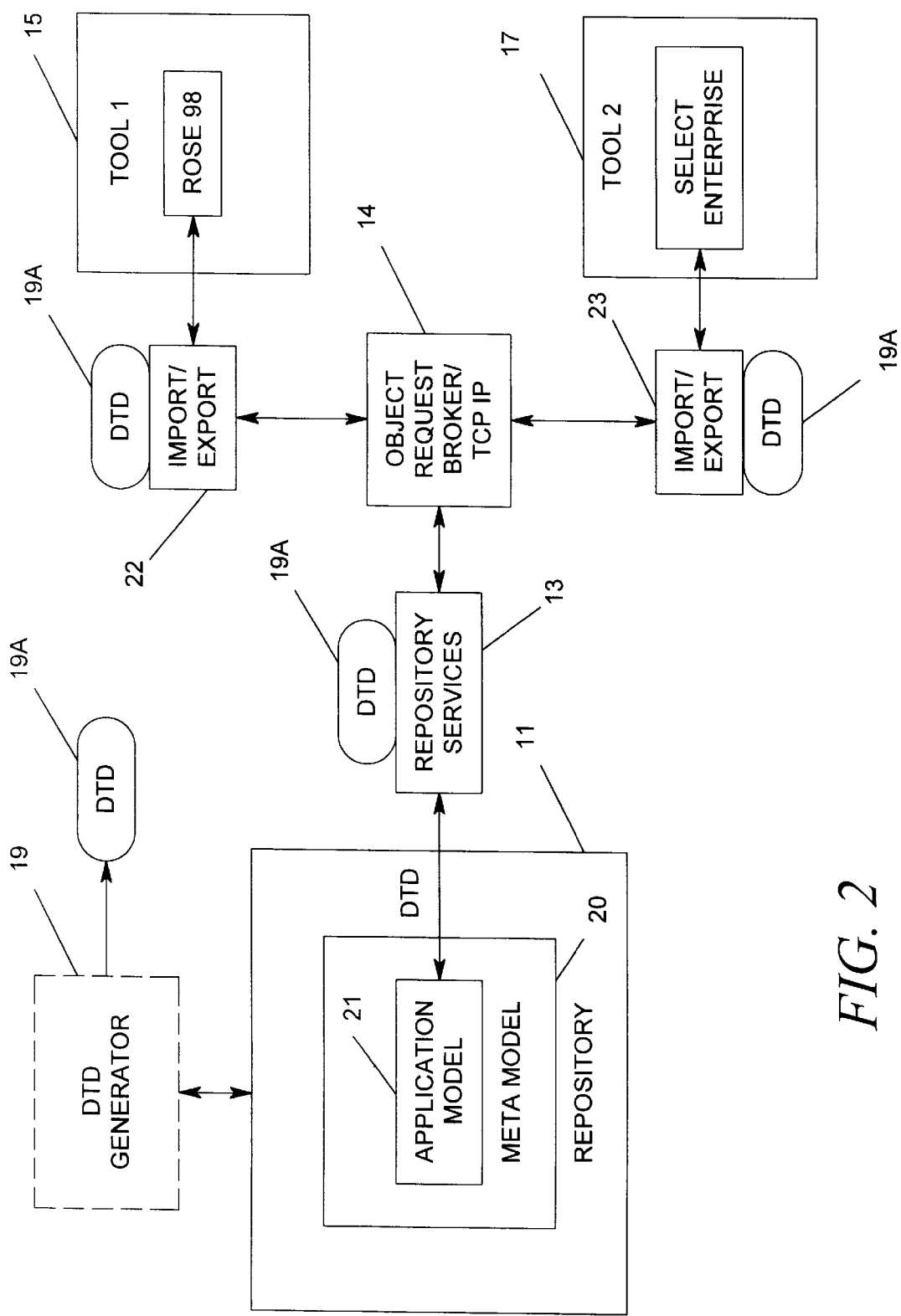
FIG. 2 is a software module block diagram of particular embodiment that may employ the method and system of the present invention.

Referring now to FIG. 2, a software module block diagram of a particular arrangement that may employ the method and system of the present invention is shown. The repository 11 contains within it a meta model 20, which includes an application model 21 that is made available (via the repository services 13) to the ORB 14. The DTD generator 19 is again illustrated in dashed lines to denote the fact that it is occurs earlier in time. The application model 21 may for example comprise an accounting system; and, the meta model 20 could be UML.

The ORB 14 is coupled to the tool 15 by means of an import/export module 22; and, in a like manner to the tool 17 by means of an import/export module 23. The term "import" as used herein shall mean the creation of an object based on a description of an object transmitted from an external entity. The term "export" as used herein shall mean the transmission of an object to an external entity. The application model 21 communicates with the ORB through the repository services 13.

An XML DTD may define a "root element" in which all content is defined. The root element for an XMI DTD is the "XMI" element. The XMI DTD element produced by the method of the present invention comprises the meta-syntactic hierarchy illustrated in FIGS. 3A through 3C, and described hereinafter. The following convention is used in describing FIGS. 3A through 3C. A bubble represents a meta-syntactic variable of the DTD grammar being used by the method of this invention. It may be attached to other bubbles by one of three types of arrows. An arrow that points to the right indicates that the bubble to the left and the bubble to the right form a sequence. An arrow pointing from a bubble to itself indicates that the bubble may be repeated in a sequence. An arrow pointing downward indicates a syntactic resolution. That is, the item in the lower bubble refines the item in the upper bubble, or stated conversely, the upper bubble "produces" the lower bubble. When there is more than one downward pointing arrow, the bubbles so connected represent mutually-exclusive alternative resolutions of the upper bubble. In other words, the upper bubble produces exactly one of its possible alternatives.

Figure 3A:
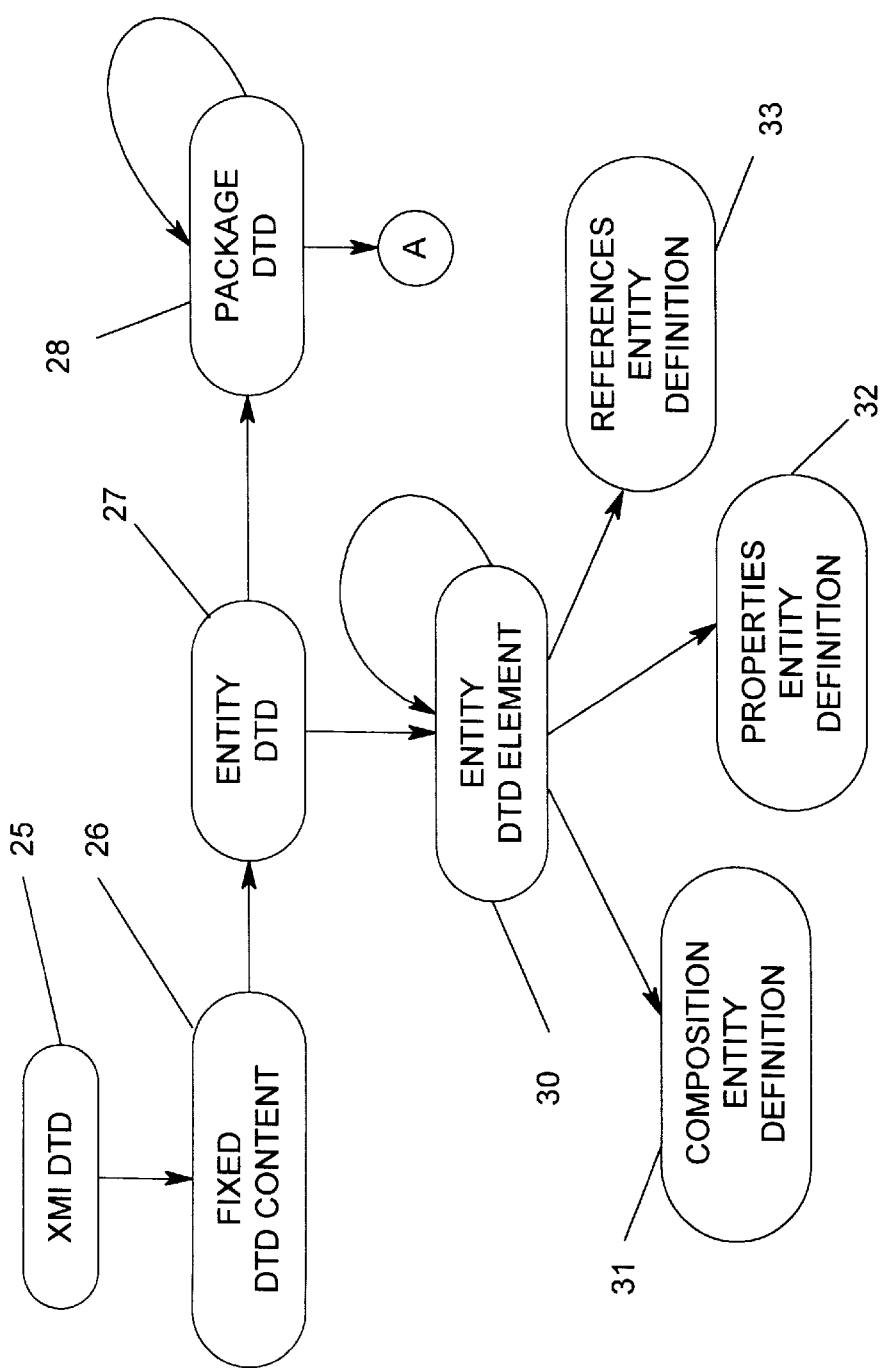
FIGS. 3A, 3B and 3C illustrate a hierarchy of the syntactic bases for generating an XML DTD by applying the present invention.

Referring now to FIGS. 3A, the first of a three-part diagram illustrating a hierarchy of meta-syntactical variables for generating an XML DTD by applying the present invention is shown. As the DTD productions in the first above-cited co-pending patent application (hereafter referred to as the "First Rule Set") are very simple; they can result in large DTD's. The repetition of detail also makes it difficult to perform modifications for the purposes of extension or experimentation. This is due to the fact that the object contents and any enumerated attribute list values are given for not only an object but for all of the Classes from which it is inherited, direct or indirect.

Although the productions in the above cited patent application Ser. No. 09/282,345 ("Rule Set 1"), now U.S. Pat. No. 6,289,501 B1, are more compact than that taught by the patent application Ser. No. 09/282,102 ("Rule Set 2"), now U.S. Pat. No. 6,253,366 B1, it still means the repetition of a number of entity names in each element definition. The method taught by this application ("Rule Set 3") allows for the grouping of the parts of an object into entity definitions, as in the Grouped Entity Rule Set (Rule Set 2) and adds the ability to group the usage of these definitions into hierarchies that reflect the generalization hierarchy(s) in the defined meta-model. The size of the generated DTD is approximately the same as that in Rule Set 2.

This Rule Set 3 requires much more computational complexity than the Simple DTD Rule Set 1 and somewhat more than in the Grouped Entity Rule Set 2. In particular, the DTD generation program must:

Generate the entities for a Class in inheritance order, i.e. starting at the topmost Class(es), in any inheritance hierarchy(ies) and proceed downward and avoid duplication of entities in cases of multiple inheritance; and, Be able to keep a table of generated enumerated type entities in order to reuse them and avoid duplicate entity generation.

As in the Simple DTD Rule Set 1 and the Grouped Entity Rule Set 2, the DTD for a MOF-based meta-model consists of a set of DTD definitions for the outermost Packages in the meta-model.

One of the principal difficulties of the hierarchical approach to DTD generation is the problem of multiple inheritance. It is possible for a Class to have ore than one immediate parent. If both of these parent lasses have a common ancestor, then only one of the inheritance paths can be used in generating the parent entity references. Attributes, References and Composed roles for Classes on other paths must be listed explicitly. The method for doing this is described in the flow charts illustrated in FIGS. 14 through 19, and described hereinbelow.

An XMI DTD 25 comprises a Fixed DTD content 26, and an Entity DTD 27 followed by one or more Package DTD's 28 for the outermost MOF Packages in the meta-model 20. The Fixed Content 26 is a fixed string of text as defined in the OMG XMI Recommendation (*XML Metadata Interchange* (*XMI*) *OMG Document ad*/98-10-05, chapter 7). The Package DTD 28 comprises the DTD fragments for the items in a MOF Package in the meta-model 20. Each Package DTD 28 comprises zero (in theory; in practice the value is one) or more Package DTD Elements 29 (FIG. 3B, via connector A).

The Entity DTD 27 further includes an Entity DTD Element 30. The Entity DTD Element 30 comprises a Composition Entity Definition 31, a Properties Entity Definition 32 and a References Entity Definition 33.

Figure 3B:
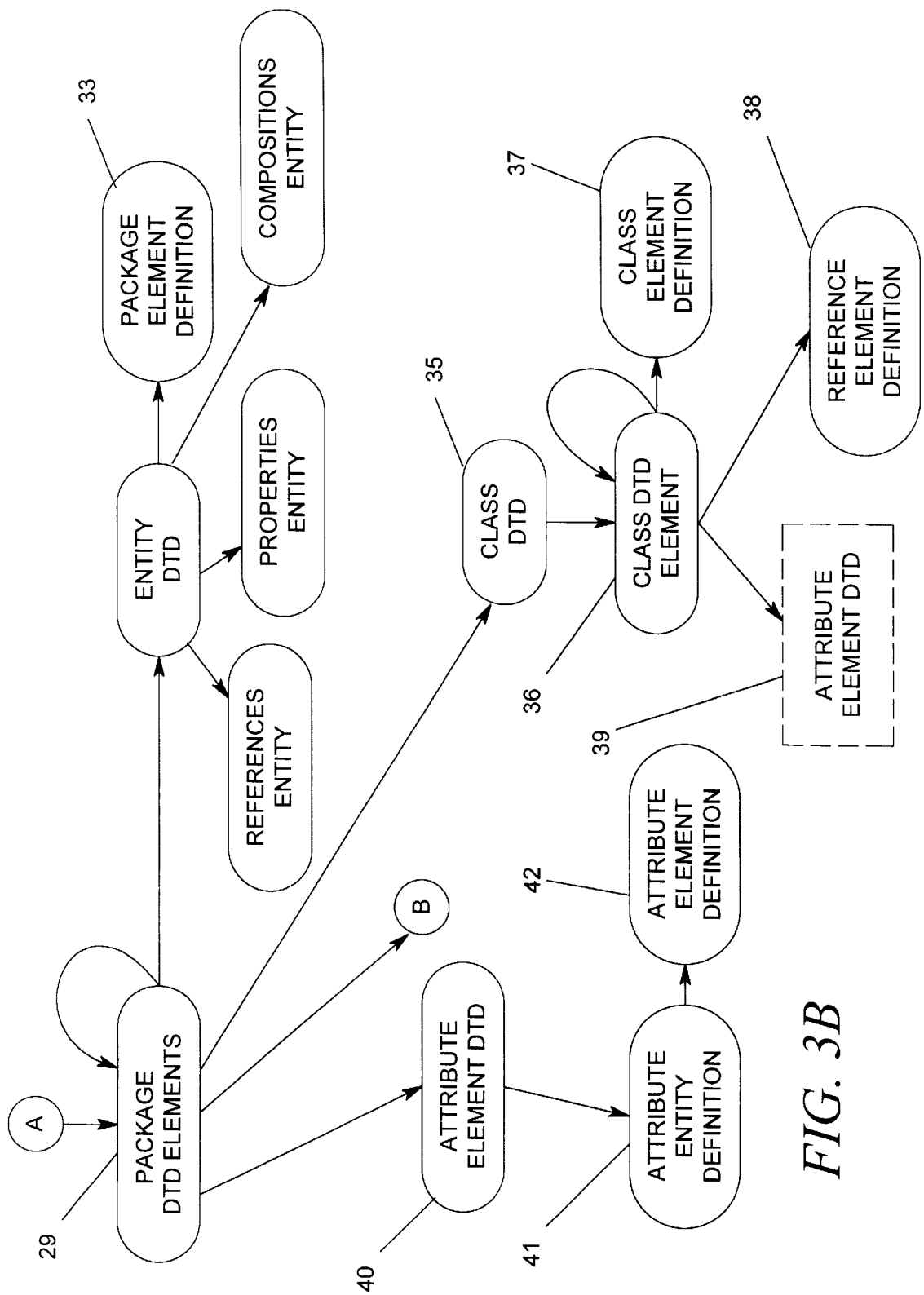

Referring now to FIG. 3B at the connector A, the Package DTD Elements 29 includes a Package Element Definition 34, which produces the XML element definition for a MOF Package in the meta-model 20. The Package DTD Elements 29 also includes a Class DTD 35, which comprises DTD fragments of the items in a MOF Class in the meta-model 20. Each Class DTD 35 includes zero (in theory; in practice the value is one) or more Class DTD Elements 36, followed by a Class Element Definition 37. The Class DTD Element 36 is either a Reference Element Definition 38 or an Attribute Element DTD 39. The Reference Element Definition 38 produces the XML element definition for the MOF References made by a MOF Class in the meta-model 20; and, the Class Element Definition 37 produces the XML element definition for a MOF Class in the meta-model 20.

The Package DTD Elements 29 also includes an Attribute Element DTD 40, which may be an Attribute Entity Definition 41 that includes an Attribute Element Definition 42. The Attribute Entity Definition 41 is an XML entity that specifies an enumerated set of values which an Attribute may have. The Attribute Element Definition 42 produces the XML element definition for the MOF Classes that are owned by other MOF Classes in the meta-model 20.

Figure 3C:
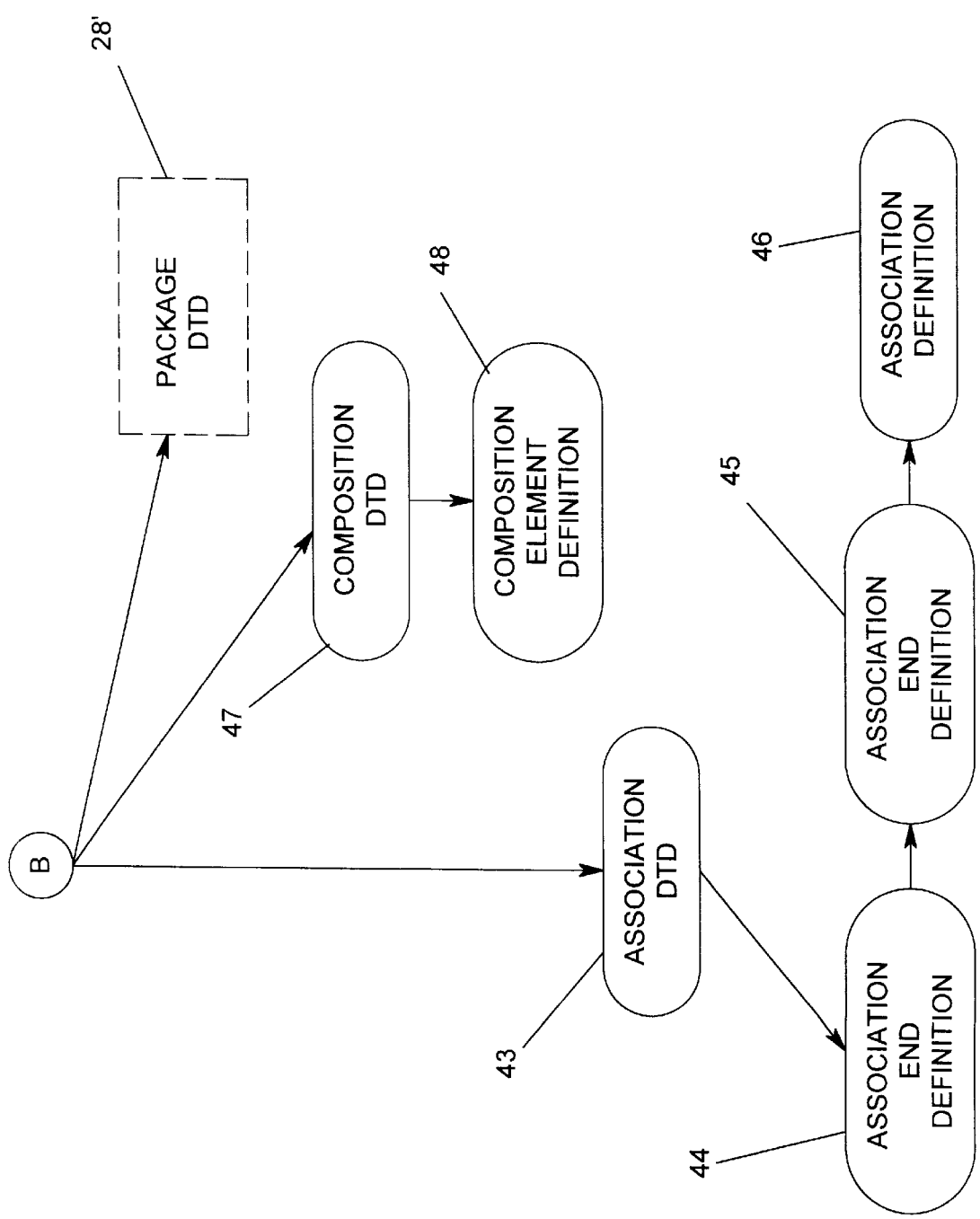

Referring now to FIG. 3C at a connector B, the Package DTD Elements 29 further a Package DTD 28' (which is a recursive use of the Package DTD 28) and an Association DTD 43 that includes the DTD fragments of an un-referenced Association in the meta-model 20. Each Association DTD 43 comprises two Association End Definitions 44 and 45, followed by an Association Definition 46. The Association End Definition 45 produces the XML element definition for an un-referenced AssociationEnd in the meta-model 20. The Association Definition 46 produces the XML element definition for an un-referenced Association in the meta-model 20.

With reference back to the connector B, the Package DTD Elements 29 also includes a Composition DTD 47 followed by a Composition Element Definition 48. The Composition Element Definition 48 produces the XML element definition for the MOF Classes which are owned by other MOF Classes in the meta-model 20.

In the descriptions of flow charts that follow, terms such as "Package", "Class", "Attribute", etc., are capitalized to indicate that they are specific types of meta-model objects.

Figure 4:
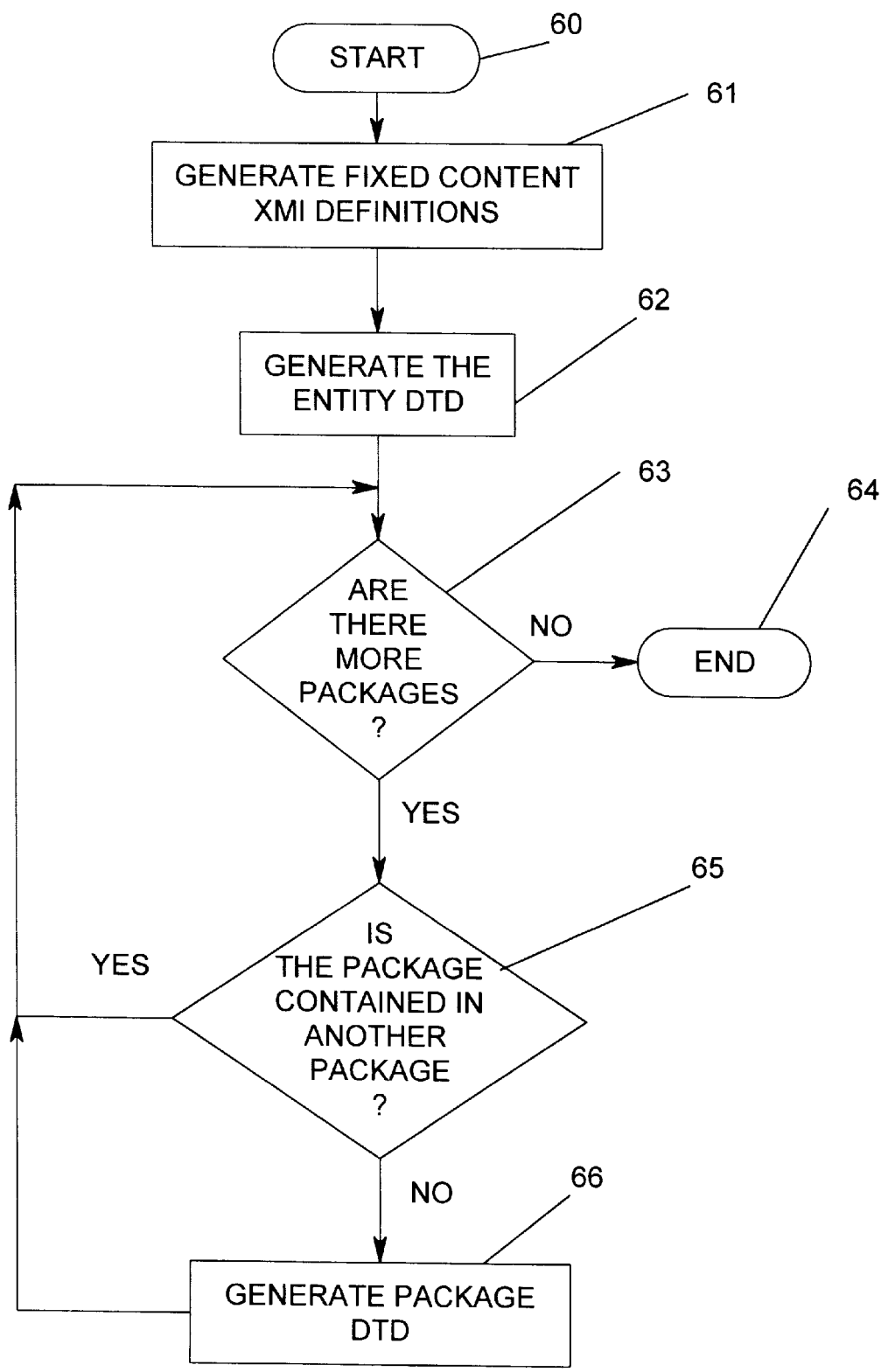
FIG. 4 is a flow chart of the DTD generation process.
Figure 5A:
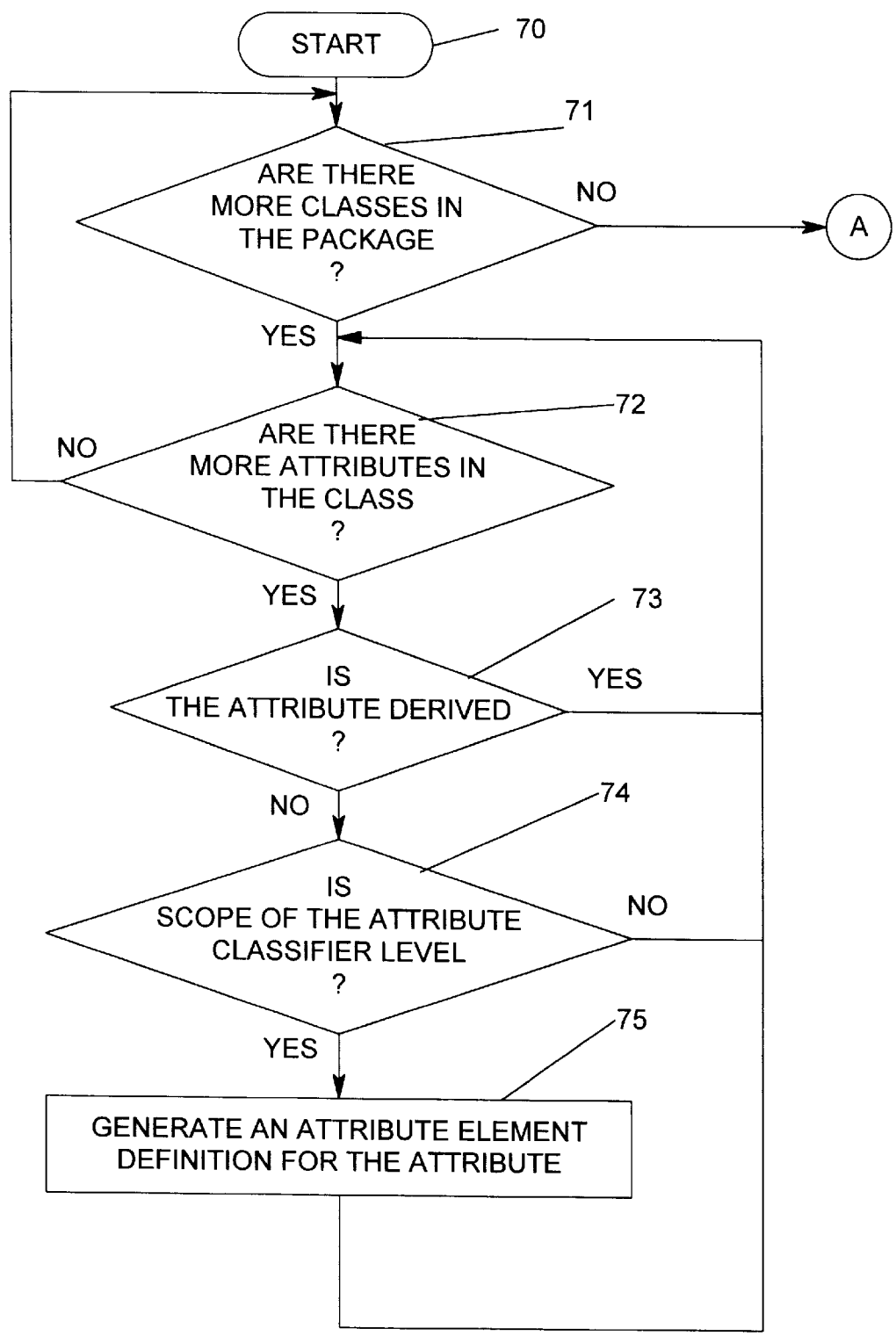
FIGS. 5A, 5B and 5C combined form a flow chart of the Package DTD generation process.
Figure 5B:
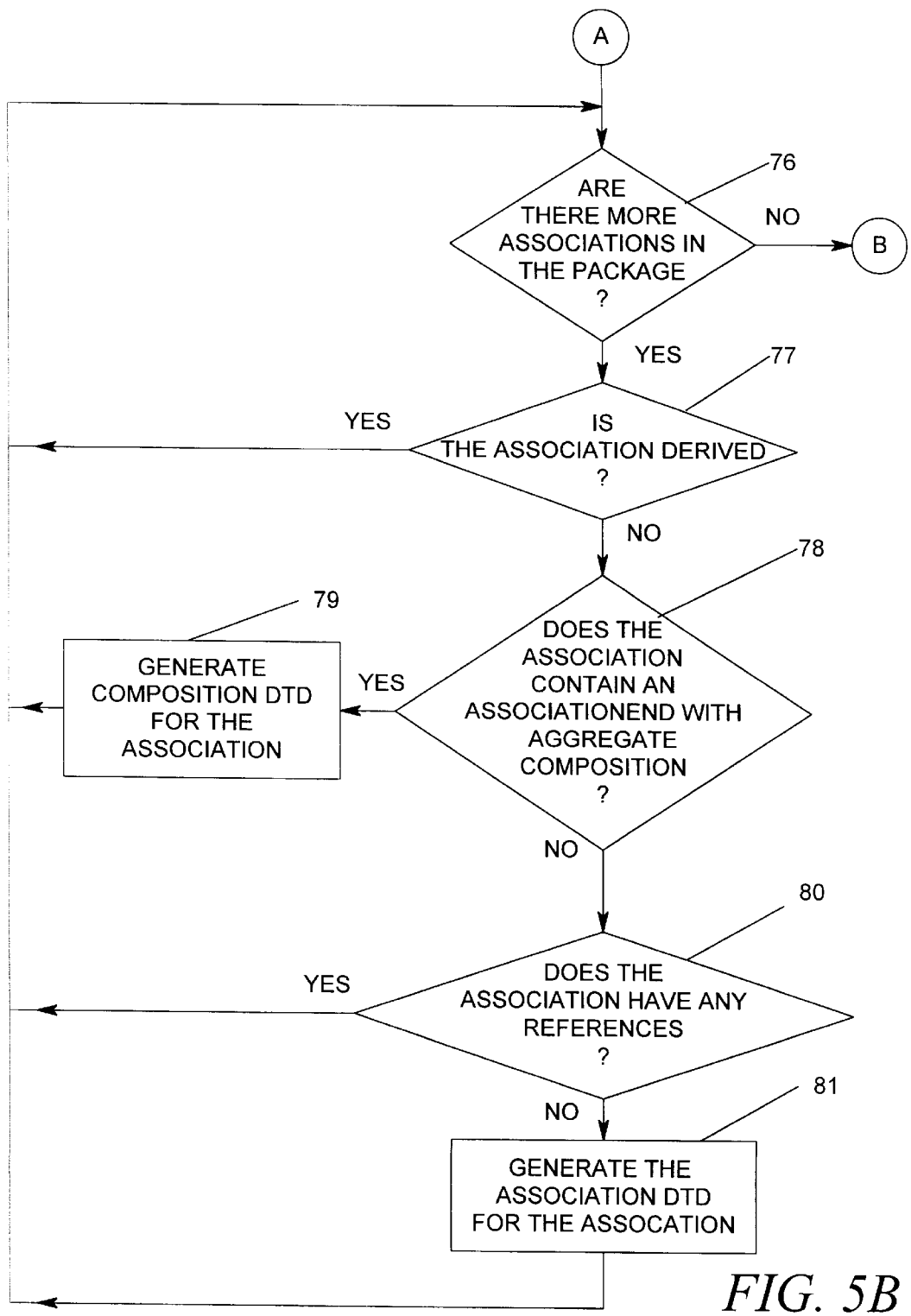
Figure 5C:
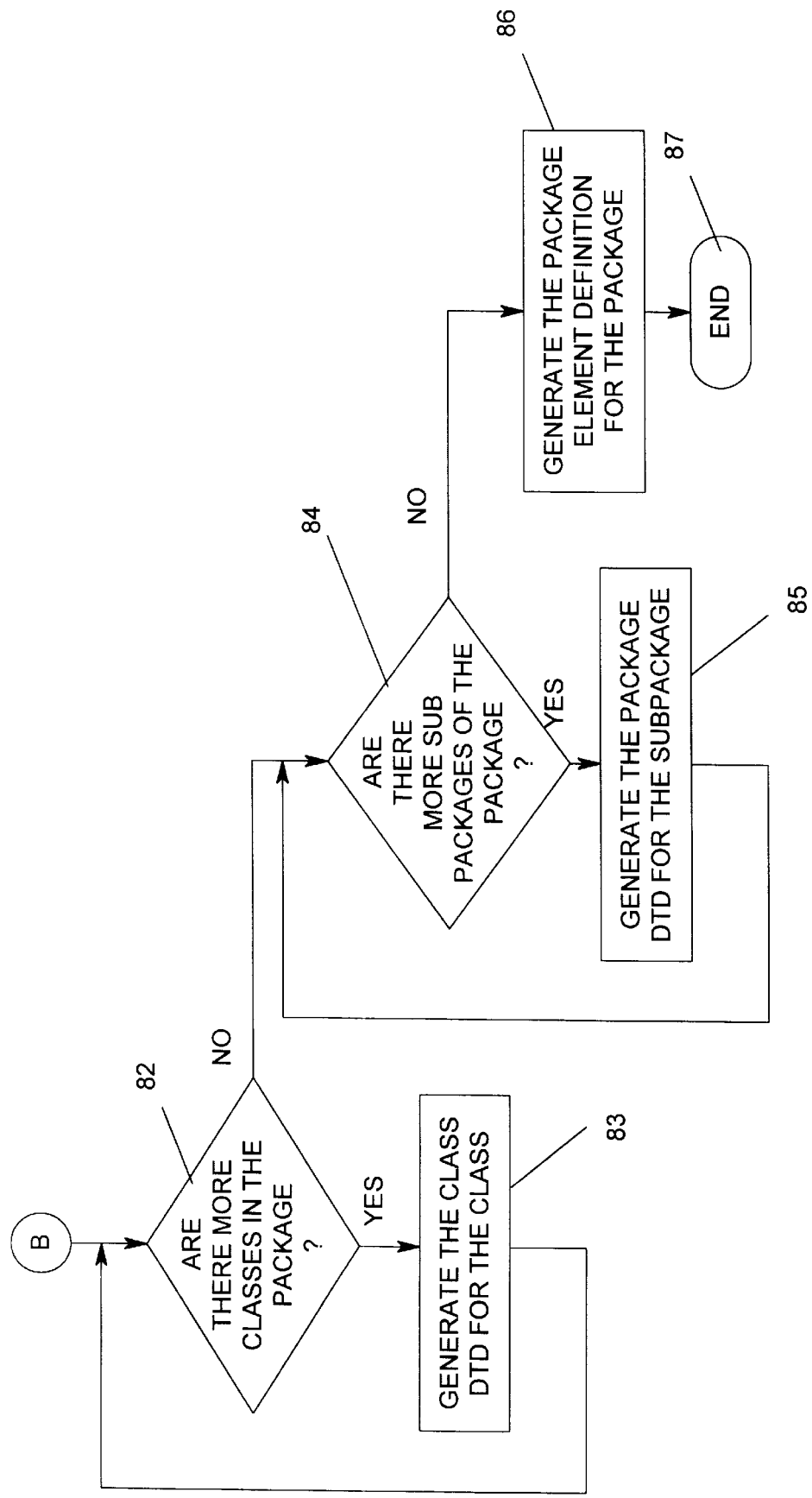

Referring now to FIG. 4, a flow chart of the DTD generation process is shown. The process begins with a start bubble 60 followed by a step of generating fixed content XMI definitions (block 61). Next, the entity DTD 20 is generated (block 62) followed by an inquiry as to whether or not there are more Packages (diamond 63). If the answer to this inquiry is no, then the process ends (bubble 64). On the other hand, if there are more Packages another inquiry is made as to whether or not the Package is contained in another Package (diamond 65). If the answer to this inquiry is yes, then a return is made back to the top of the diamond 63 for processing the next Package. On the other hand, if the answer to this inquiry is no, then a Package DTD 28 is generated (block 66). After this, a return is made back to the top of the diamond 63 for processing the next Package. Referring now to FIGS. 5A, 5B and 5C, a flow chart of the Package DTD 28 generation process is shown. The process begins with a start bubble 70 followed by an inquiry as to whether or not there are more Classes in the Package (diamond 71). If the answer to this inquiry is no, then a branch is made to a latter part of the process illustrated in FIG. 5B as denoted by a connector A. On the other hand, if the answer to this inquiry is yes, then another inquiry is made as to whether or not there are more Attributes in the Class(diamond 72). If the answer to this inquiry is no, then a return is made back to the diamond 71.

On the other hand, if the answer to the inquiry in the diamond 72 is yes, then yet another inquiry is made as to whether or not the Attribute is derived (diamond 73). If the answer to this inquiry is yes, then a return is made back to the diamond 72. On the other hand, if the answer to this inquiry is no, then still another inquiry is made as to whether or not the scope of the Attribute is classifier level (diamond 74). If the answer to this inquiry is no, then a return is made back to the diamond 72. On the other hand, if the answer to this inquiry is yes, then an Attribute Element DTD 39 for the Attribute is generated (block 75).

Referring now to FIG. 5B at the connector A, an inquiry is made as to whether or not there are more Associations in the Package (diamond 76). If the answer to this inquiry is no, then a branch is made to a latter part of the process illustrated in FIG. 5C as denoted by a connector B. On the other hand, if the answer to this inquiry is yes, then another inquiry is made as to whether or not the Association is derived (diamond 77). If the answer to this inquiry is yes, then a return is made back to the diamond 76. On the other hand, if the answer to this inquiry is no, then yet another inquiry is made as to whether or not the Association contains an AssociationEnd with an aggregate composition (diamond 78). If the answer to this inquiry is yes, then a Composition DTD 47 for the Association is generated (block 79).

On the other hand, if the answer to the inquiry in the diamond 78 is no, then still another inquiry is made as to whether or not the Association has any References (diamond 80). If the answer to this inquiry is yes, then a return is made back to the diamond 76. On the other hand, if the answer to this inquiry is no, then the Association DTD 43 for the Association is generated (block 81) and back to 76.

Referring now to FIG. 5C at the connector B, an inquiry is made as to whether or not there are more Classes in the Package (diamond 82). If the answer to this inquiry is yes, then the Class DTD 35 for the Class is generated (block 83). On the other hand, if the answer to this inquiry is no, then yet another inquiry is made as to whether or not there are more sub-Packages (diamond 84). If the answer to this inquiry is yes, then the Package DTD 28' for the sub-Package is generated (block 85) and a return is made back to the top of the diamond 84. On the other hand, if the answer to this inquiry is no, then the Package Element Definition 34 for the Package is generated (block 86) and the process ends (bubble 87).

Figure 6A:
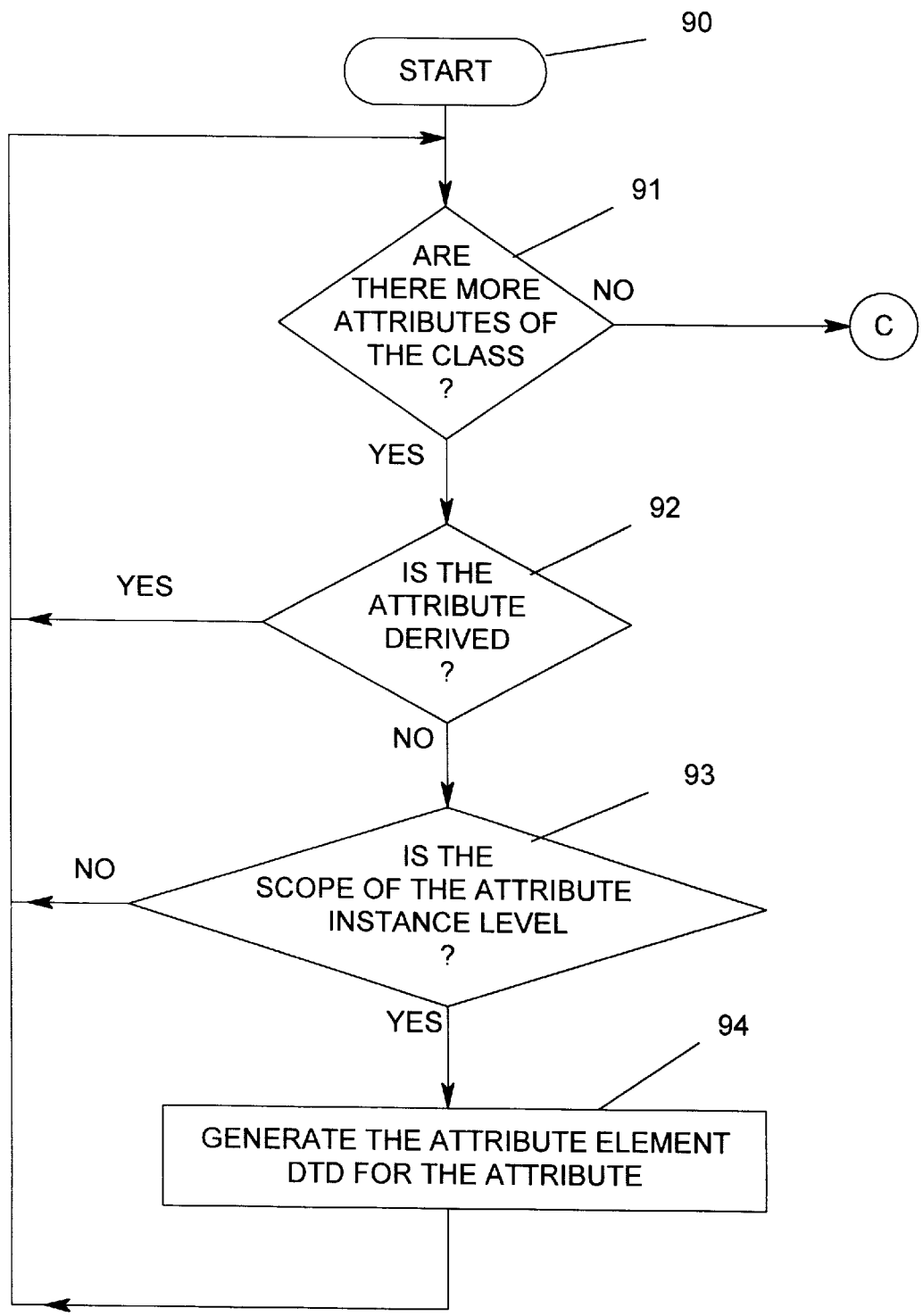
FIGS. 6A and 6B combined form a flow chart of the Class DTD generation process.
Figure 6B:
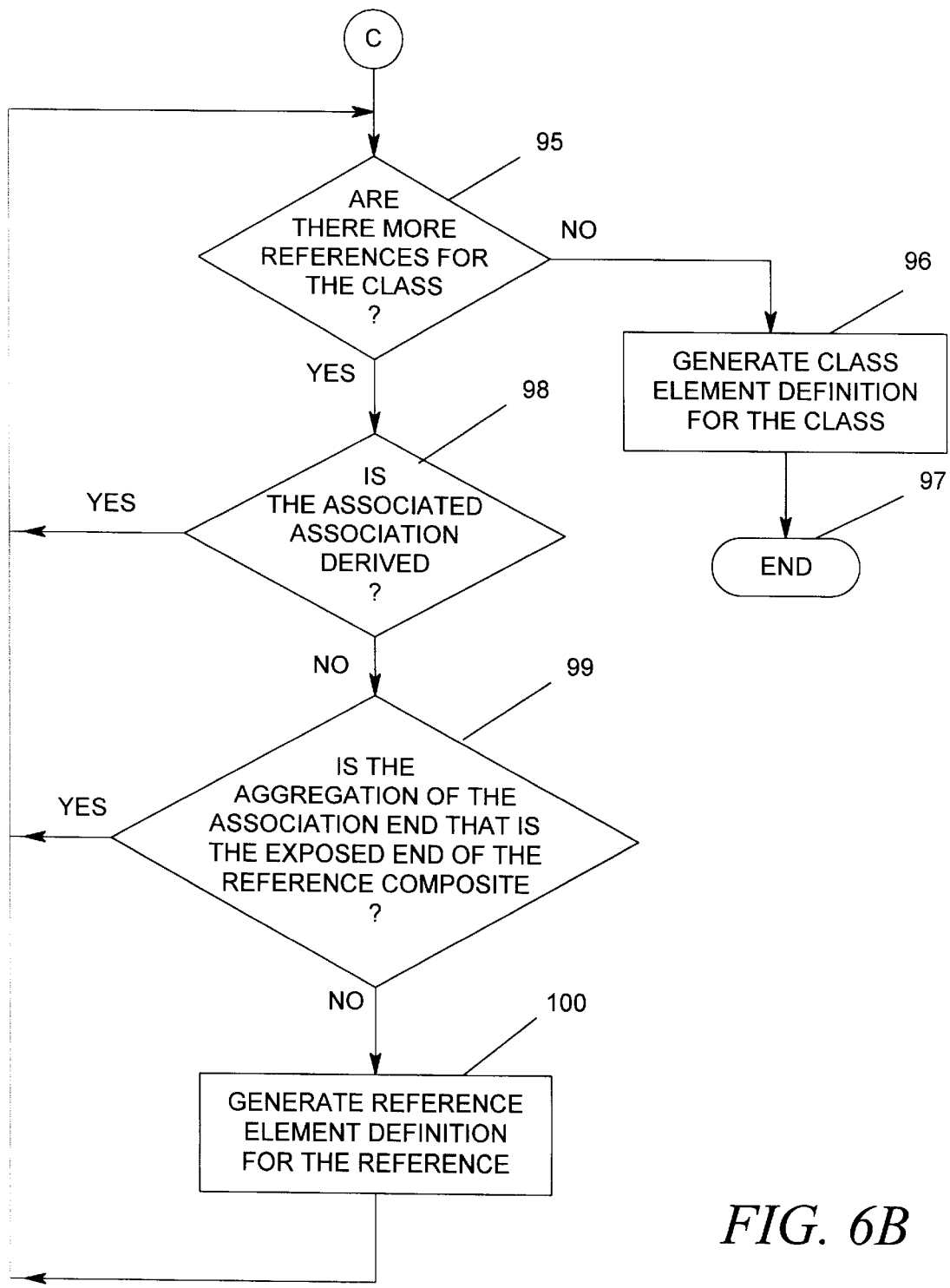

Referring now to FIGS. 6A and 6B a flow chart of the Class DTD 35 generation process is shown. The process begins with a start bubble 90, followed by an inquiry as to whether or not there are more Attributes of the Class (diamond 91). If the answer to this inquiry is no then a branch is made to a latter part of the process illustrated in FIG. 6B at connector C. On the other hand, if the answer to this inquiry is yes, then another inquiry is made as to whether or not the Attribute is derived (diamond 92). If the answer to this inquiry is yes, then a return is made back to the diamond 91. On the other hand, if the answer to this inquiry is no, then yet another inquiry is made as to whether or not the scope of the Attribute is instance level (diamond 93). If the answer to this inquiry is no, then a return is made back to the diamond 91. On the other hand, if the answer to this inquiry is yes, then an Attribute Element DTD 40 for the Attribute is generated (block 94) and back to 91.

Referring now to FIG. 6B at the connector C, an inquiry is made as to whether or not there are more References for the Class (diamond 95). If the answer to this inquiry is no, then a Class Element Definition 37 for the Class is generated (block 96) and the process ends (bubble 97). On the other hand, if there are more References for the Class, then another inquiry is made as to whether or not the associated Association is derived (diamond 98). If the answer to this inquiry is yes, then a branch is made back to the diamond 95. On the other hand, if the answer to this inquiry is no, then another inquiry is made as to whether or not the aggregation of the AssociationEnd that is the exposed end of the Reference is composite (diamond 99). If the answer to this inquiry is yes, then a return is made back to the diamond 95. On the other hand, if the answer to this inquiry is no, then the Reference Element Definition 38 for the Reference is generated (block 100). After this a branch is made back to the diamond 95.

Figure 7:
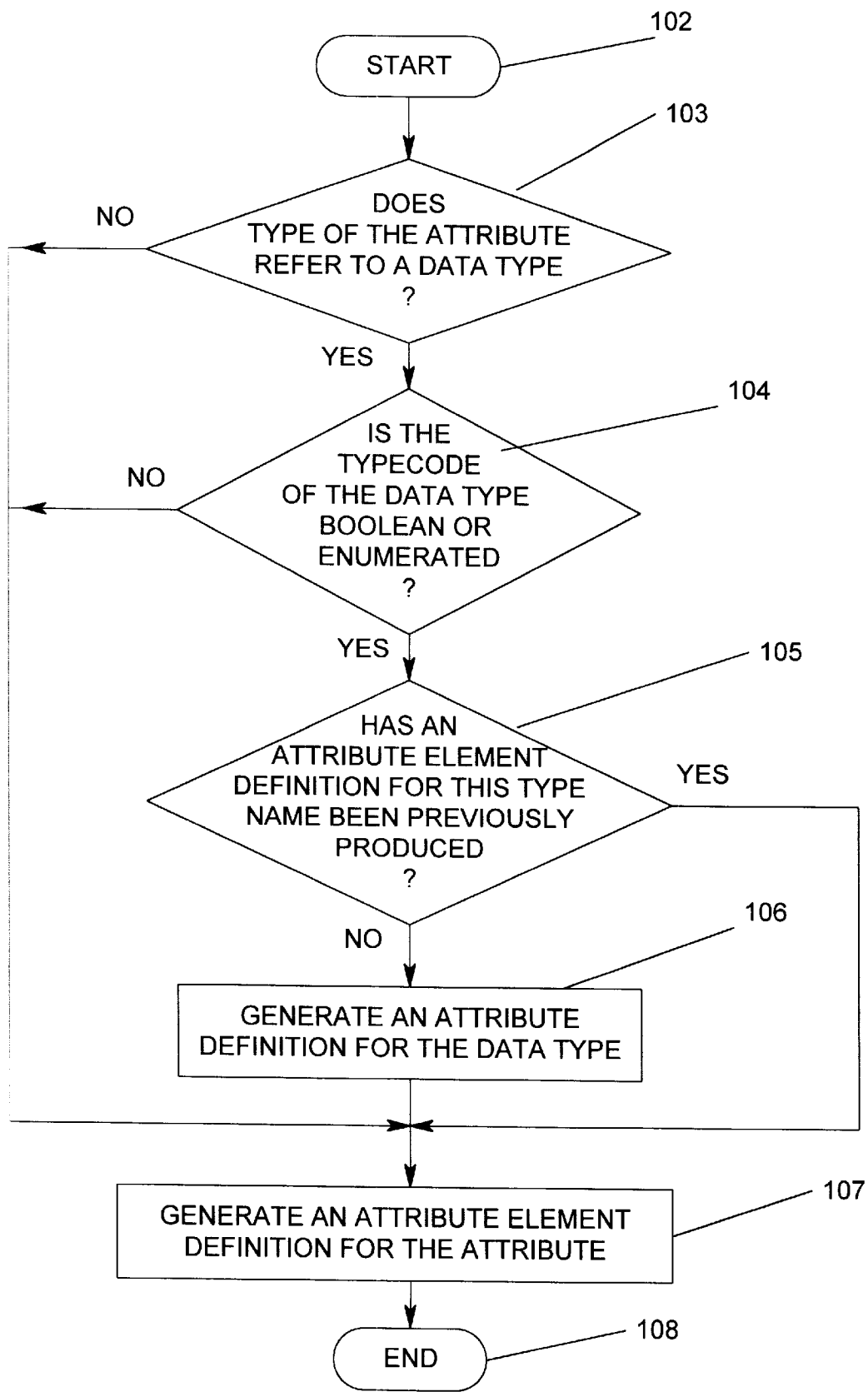
FIG. 7 is a flow chart of the Attribute DTD Definition process.

Referring now to FIG. 7, a flow chart of the Attribute Element DTD 40 process is shown. The process begins with a start bubble 102 followed by an inquiry as to whether or not the type of the Attribute refers to a data type (diamond 103). If the answer to this inquiry is no, then a branch is made to a latter part of this process. On the other hand, if the answer to this inquiry is yes, then another inquiry is made as to whether or not the type code of the data type is Boolean or Enumerated (diamond 104). If the answer to this inquiry is no, then a branch is made to a latter part of this process. On the other hand, if the answer to this inquiry is yes, then yet another inquiry is made as to whether or not an Attribute Entity Definition 41 for this type name has been previously produced (diamond 105). If the answer to this inquiry is yes, then a branch is made to a latter part of this process. On the other hand, if the answer to this inquiry is no, then an Attribute Entity Definition 41 for the data type is generated (block 106). Upon completion of the step depicted by the block 106, or if the answer to the inquiry in the diamond 103 or diamond 104 is no, then an Attribute Element Definition 42 for the Attribute is generated (block 107) and the process ends (bubble 108).

Figure 8:
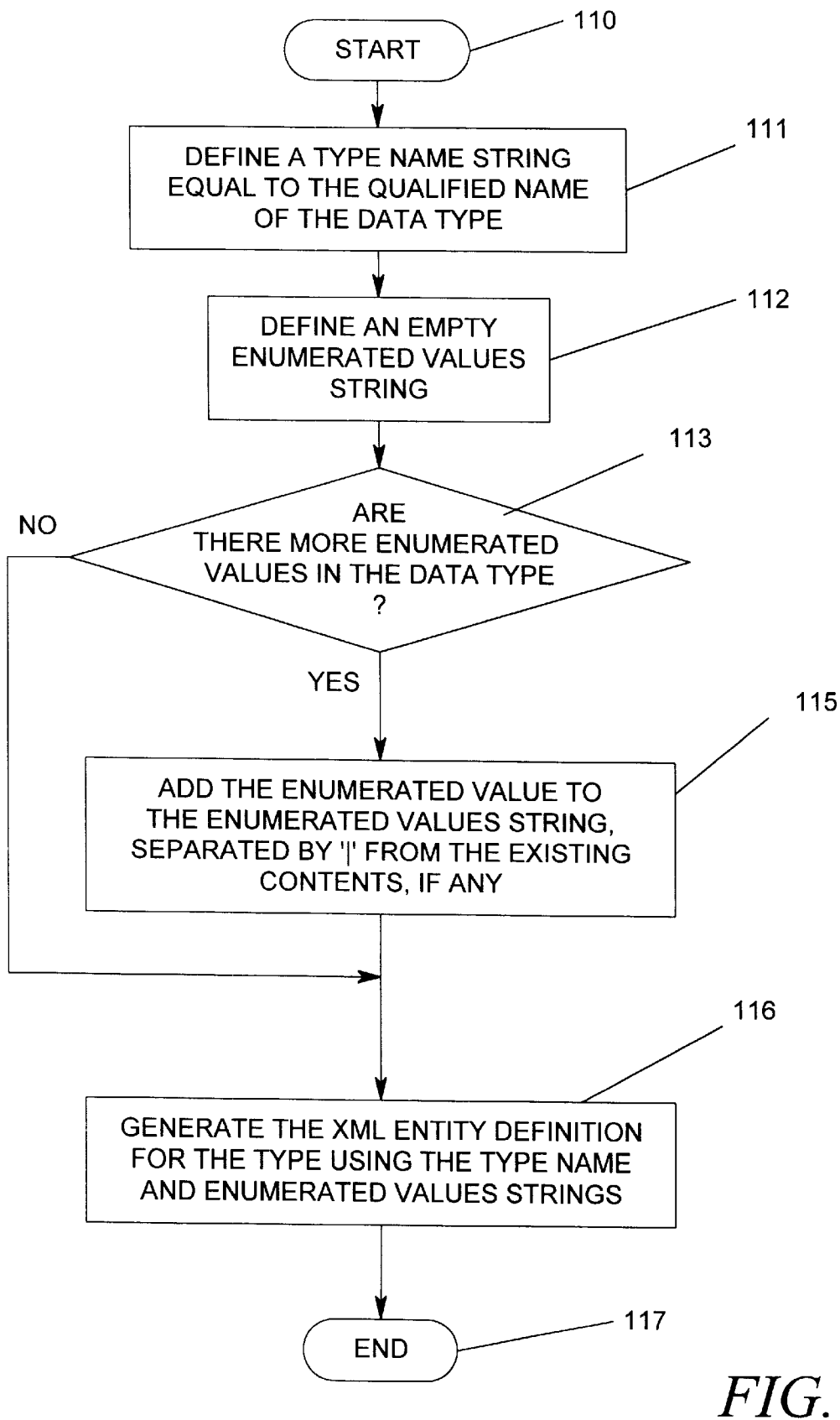
FIG. 8 is a flow chart illustrating the Attribute Entity Definition generation process.

Referring now to FIG. 8, a flow chart of the process for generating the Attribute Entity Definition 41 is shown. The process begins with a start bubble 110 followed by a step of defining a type name string equal to the qualified name of the data type (block 111). Next, an empty enumerated values string is defined (block 112). After this, an inquiry is made as to whether or not there are more enumerated values in the data type (diamond 113). If the answer to this inquiry is no, then a branch is made to a latter part of this process and will be described further hereinafter. On the other hand, if the answer to this inquiry is yes then the enumerated value is added to the enumerated values string, separated by a vertical bar ("|") from the existing contents, if any (block 115).

Upon completion of the step depicted by the block 115, or if the answer to the inquiry in the diamond 113 is no, then the XML entity definition for the type is generated using the type name and enumerated values string (block 116) and the process ends (bubble 117).

Figure 9:
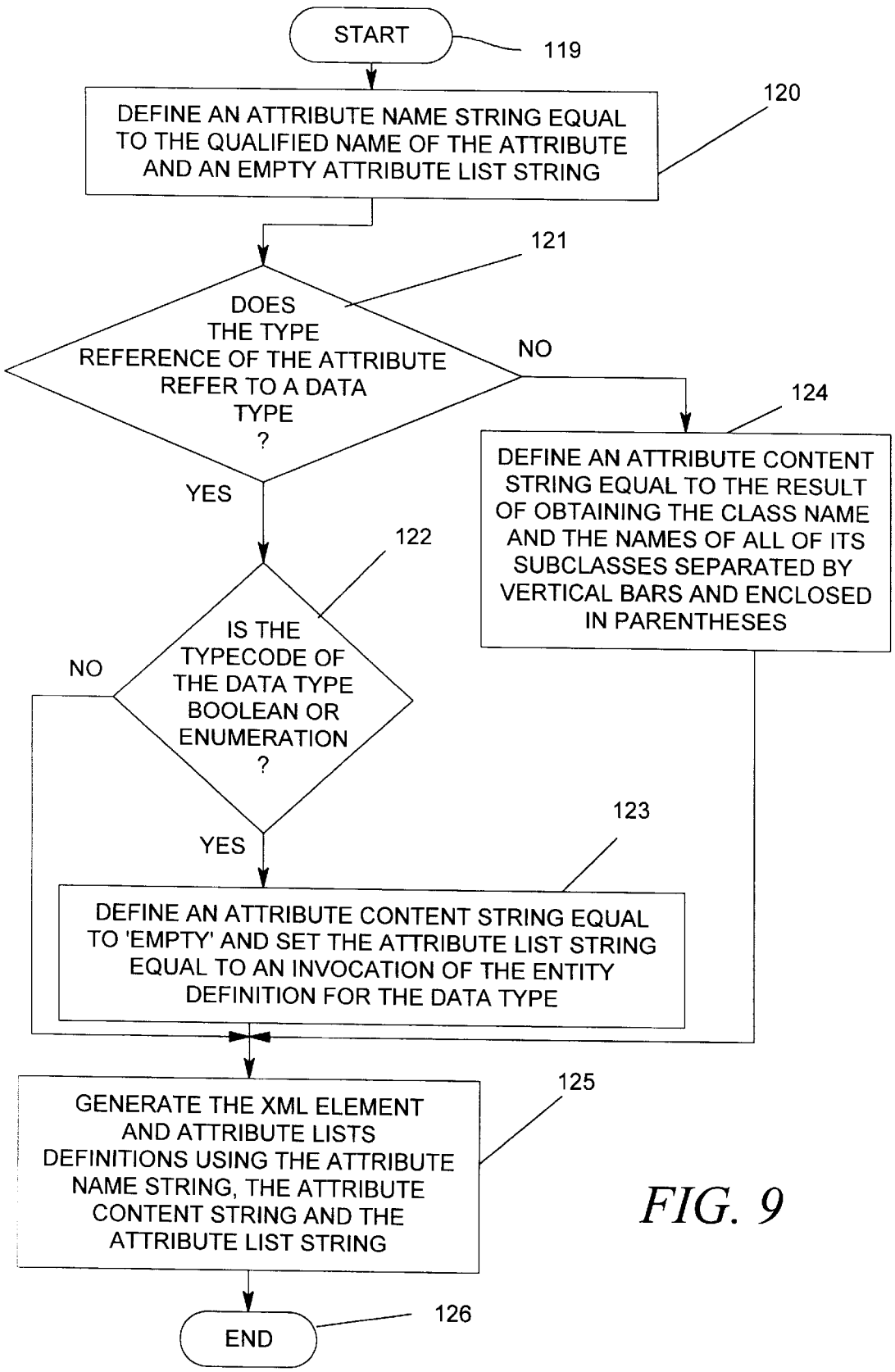
FIG. 9 is a flow chart illustrating the Attribute Element Definition generation process.

Referring now to FIG. 9, a flow chart of the Attribute Element Definition 42 generation process is shown. The process begins with a start bubble 119 followed by a step of defining an attribute name string equal to the qualified name of the Attribute and an empty Attribute list string (block 120). Next, an inquiry is made as to whether or not the type reference of the Attribute refers to a data type (diamond 121). If the answer to this inquiry is yes, then another inquiry is made as to whether or not the type code of the data type Boolean or enumeration (diamond 122). If the answer to this inquiry is yes, then an attribute content string is defined equal to "EMPTY" and the attribute list string is set equal to an invocation of the XML entity definition for the data type (block 123).

If the answer to the inquiry depicted by the diamond 121 is no, then an Attribute content string is defined equal to the result of obtaining the Class name and the names of all of its sub-Classes, separated by vertical bars "|", to indicate that only one is to be used, and enclosed in parentheses (block 124). Upon completion of this step, or upon completion of the step depicted by the block 123, or if the answer to the inquiry in the diamond 122 is no, then the XML element and attlist Definitions are generated using the attribute name string, the attribute content string and the attribute list string (block 125). Upon completion of the step depicted by the block 125 the process ends (bubble 126).

Figure 10A:
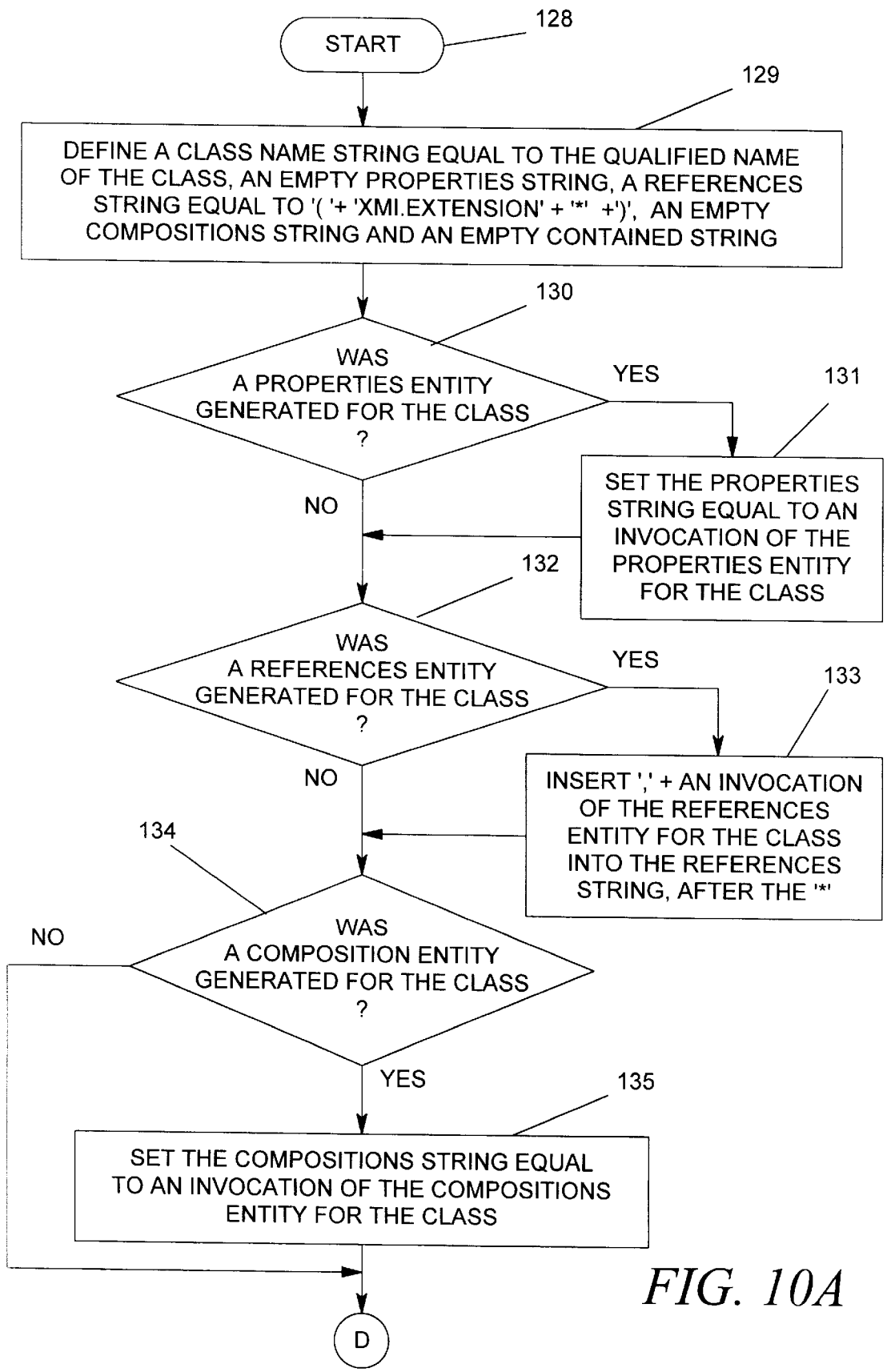
FIGS. 10A and 10B combined form a flow chart of the Class Element Definition generation process.

Referring now to FIG. 10A, a flow chart of the Class Element Definition 37 generation process is shown. The process begins with a start bubble 128 followed by a step of defining a Class name equal to the qualified name of the Class, an empty Properties string, a References string equal to "(" & "XML.extension" & "*" & ")" (where "&" indicates string concatentation), an empty compositions string and an empty contained string (block 129). Next, an inquiry is made as to whether or not a Properties Entity 32 was generated for the Class (diamond 130). If the answer to this inquiry is yes, then the properties string is set equal to an invocation of the Properties Entity for the Class (block 131).

Upon completion of the step depicted by the block 131, or if the answer to the inquiry in the diamond 130 is no, then another inquiry is made as to whether or not a References Entity 33 was generated for the Class (diamond 132). If the answer to this inquiry is yes then a comma (",") plus an invocation of the References Entity for the Class are inserted into the references string after the star ("*") (block 133). Upon completion of this step, or if the answer to the inquiry in the diamond 132 is no, then yet another inquiry is made as to whether or not a Composition Entity 31 was generated for the Class (diamond 134). If the answer to this inquiry is yes, then the compositions string is set equal to an invocation of the Compositions Entity for the Class (block 135). Upon completion of this step, or if the answer to the inquiry in the diamond 134 is no, then the process illustration continues on the next sheet of the drawings as depicted by a connector D.

Figure 10B:
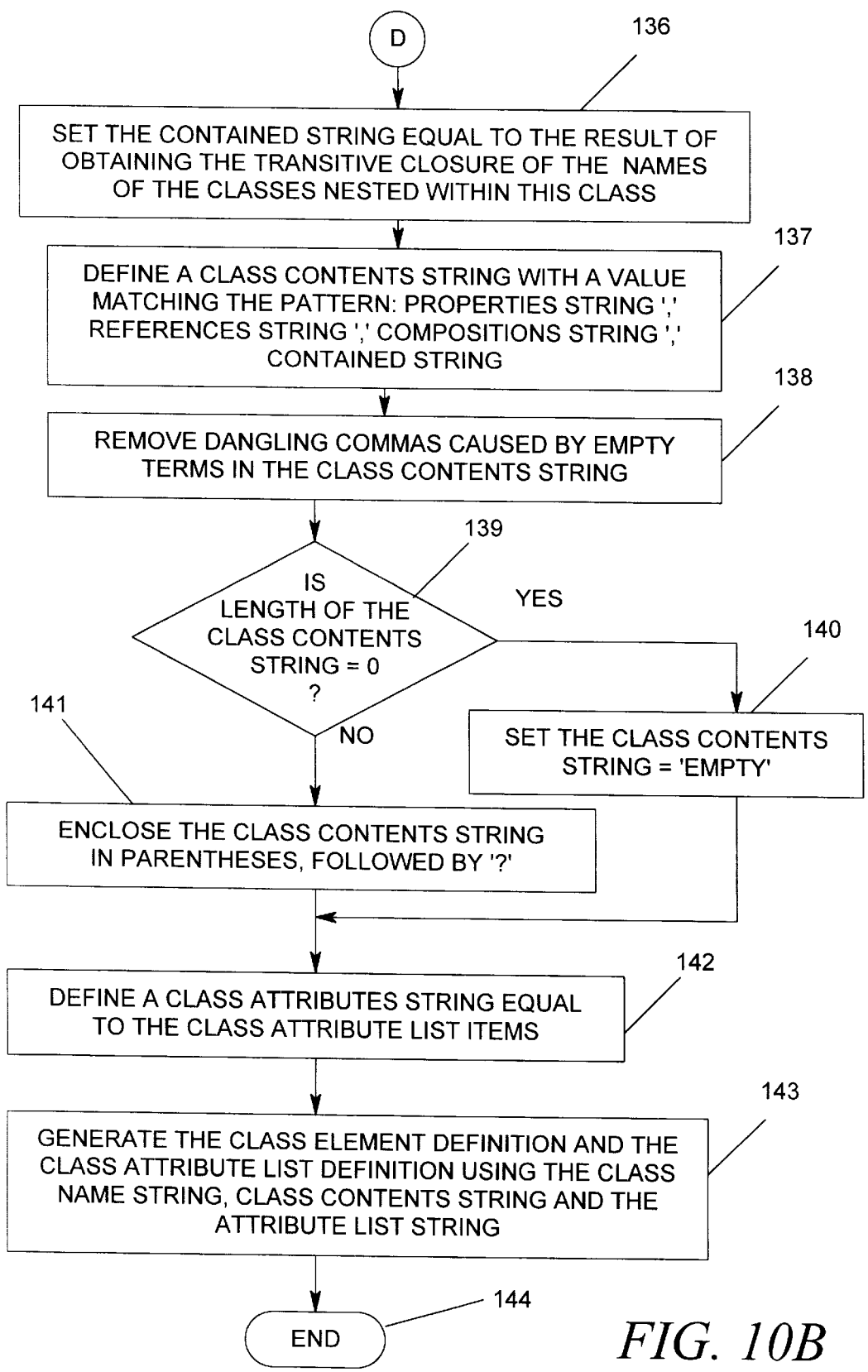

Referring now to FIG. 10B at the connector D, the contained string is set equal to the result of obtaining the transitive closure of the names of the Classes nested within this Class (block 136). Next, a class contents string is defined with a value matching the pattern: properties string "," references string ","compositions string "," contained string (block 137). Some of these strings might be empty, resulting in dangling commas in the class contents string. Therefore, the dangling commas the Class contents string are removed (block 138).

An inquiry is next made as to whether or not the length of the class contents string is equal to zero (diamond 139). If the answer to this inquiry is yes, then the class contents string is set equal to "EMPTY" (block 140). On the other hand, if the answer to this inquiry is no, then the class contents string is enclosed in parentheses, followed by a question mark ("?") (block 141). Upon completion of this step or the step depicted by the block 140, a class attributes string is defined equal to the class attribute list items (block 142). After this, the XML element and attlist definitions for the Class are generatedusing the class name string, class contents string and the attribute list string (block 143), and then the process ends (bubble 144).

Figure 11:
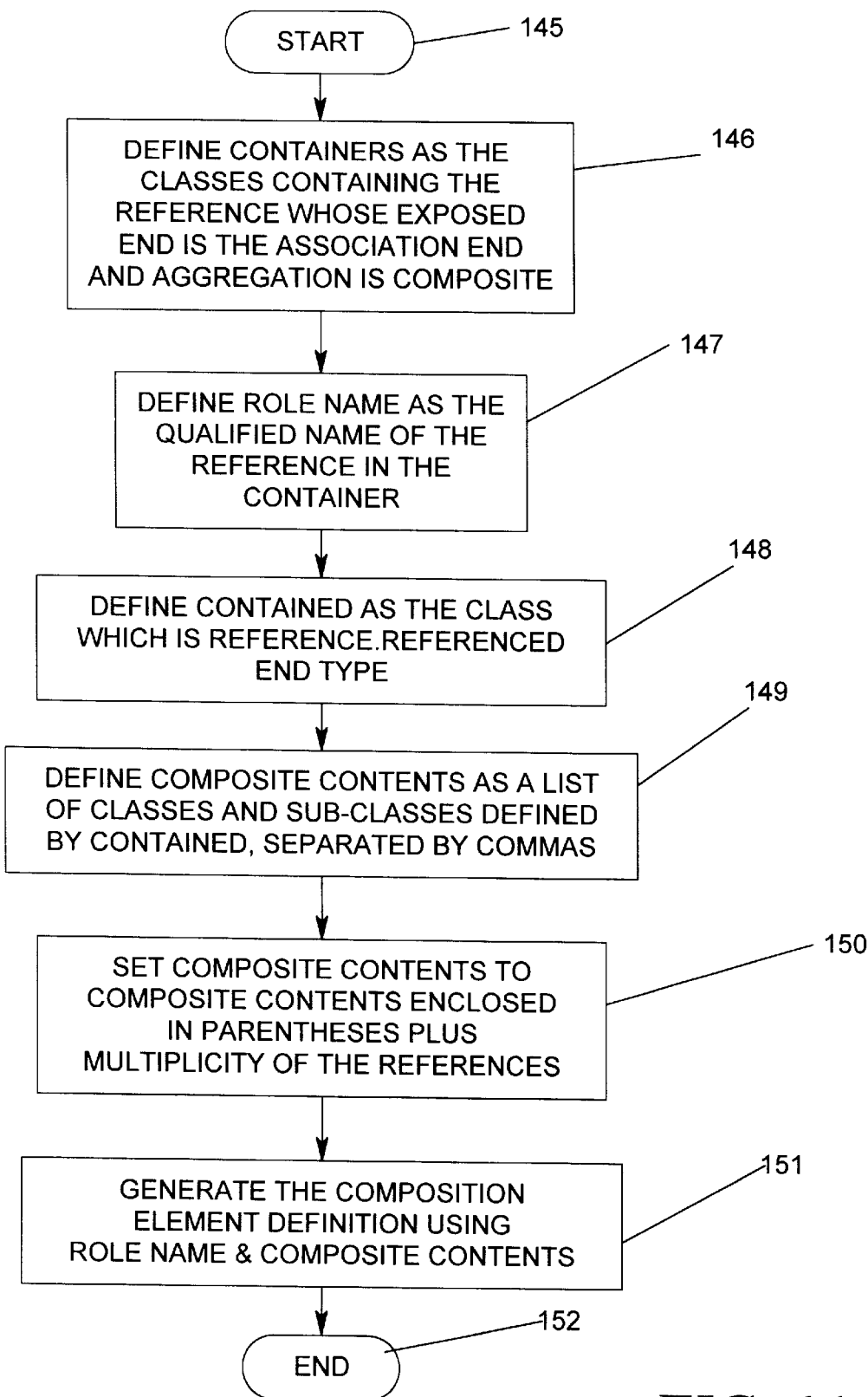
FIG. 11 is a flow chart of the Composition Element Definition process.

Referring now to FIG. 11, a flow chart of the Composition Element Definition 48 process is shown. The process begins with a start bubble 145 followed by a step of defining a variable, container, as the Class containing the Reference whose exposed end is the AssociationEnd whose aggregation is composite (block 146). Next, the role name is defined as the qualified name of the Reference in container (block 147) and the variable, contained, is defined as the Class which is the type of the referenced end of the Reference (block 148).

The composite contents string is defined as a list comprising contained and its sub-Classes, and separated by vertical bars ("|") indicating that only one is used (block 149). Next, composite contents string is set to composite contents enclosed in parentheses plus the multiplicity of the Reference (block 150). After this, the XML element is generated for the composition element using the role name and composite contents strings (block 151) and the process ends (bubble 152).

Figure 12A:
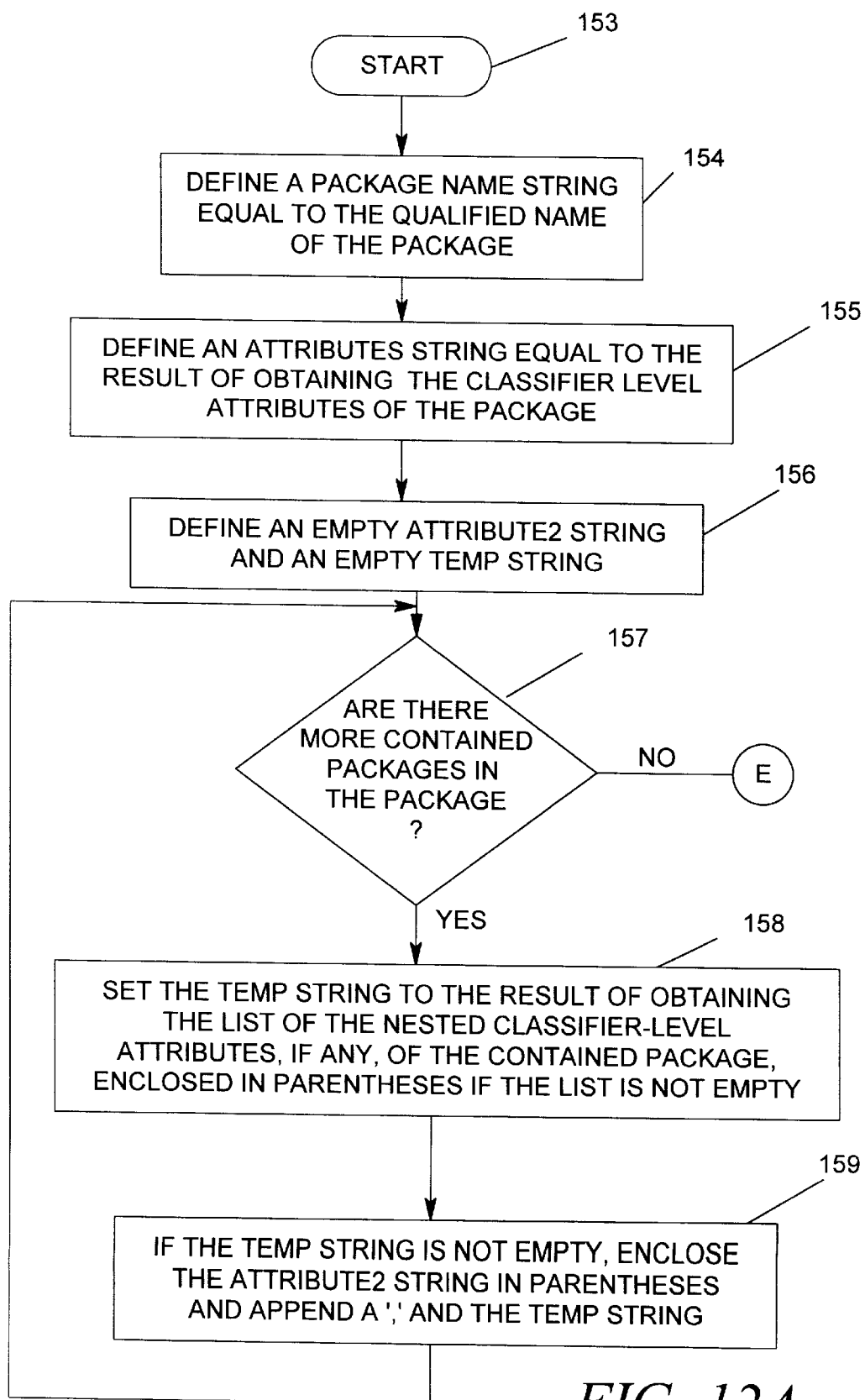
FIGS. 12A, 12B and 12C combined form a flow chart of the Package Element Definition generation process.

Referring now to FIG. 12A, the first of a three-sheet flow chart of the details of the Package Element Definition 34 generation process is shown. The process begins with a start bubble 153 followed by a step of defining a package name string equal to the qualified name of the Package (block 154). Next, an attributes string is defined equal to the result of obtaining the classifier level Attributes of the Package (block 155). Next, an empty attributes2 string and an empty Temp string are defined (block 156). After this, an inquiry is made as to whether or not there are more contained Packages in the Package (diamond 157). If the answer to this inquiry is no, then a branch is made to the next sheet of the drawings as denoted by a connector E.

If the answer to the inquiry depicted by the diamond 157 is yes, then the Temp string is set to the result of obtaining the list of the nested classifier level Attributes, if any, of the contained Package, enclosed in parentheses if the list is not empty (block 158). Next, if the Temp string is not empty, then the attributes2 string is enclosed in parentheses and a comma (",") and the Temp string are appended to it (block 159) and back to 157.

Figure 12B:
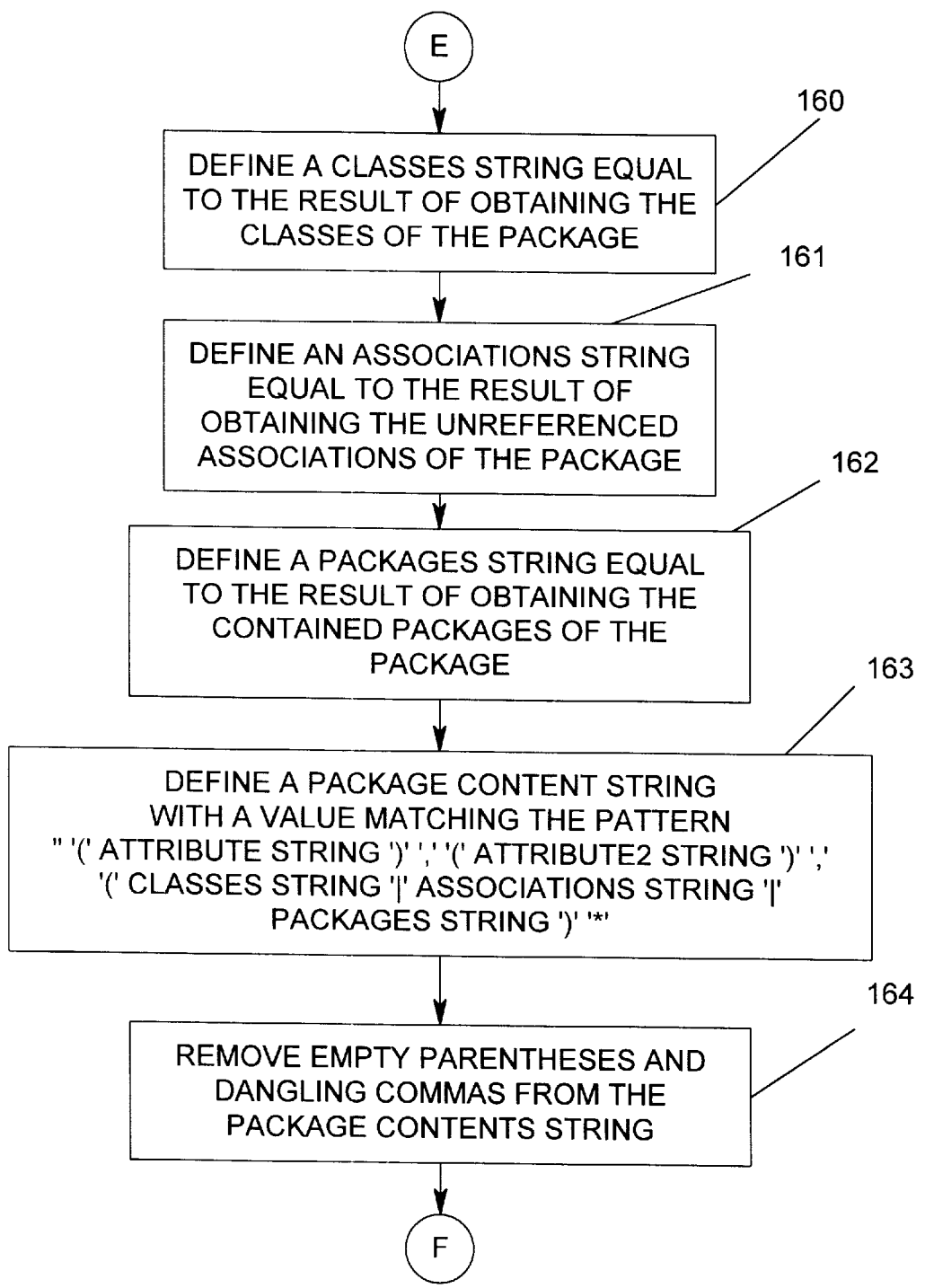

Referring now to FIG. 12B at the connector E, a classes string is defined equal to the result of obtaining the Classes of the Package (block 160). Next, an associations string is defined equal to the result of obtaining the un-referenced Associations of the Package (block 161). A packages string is then defined equal to the result of obtaining the contained Packages of the Package (block 162). After this, a Package content string is defined with a value matching the pattern: "("attributes string")" "," "("attributes2 string ")" "," "("classes string "|" associations string "|" packages string")" "*" (block 163). Any empty parentheses and dangling commas are then removed from the package contents string (block 164). The process illustration continues in the next sheet of the drawings as depicted by a connector F.

Figure 12C:
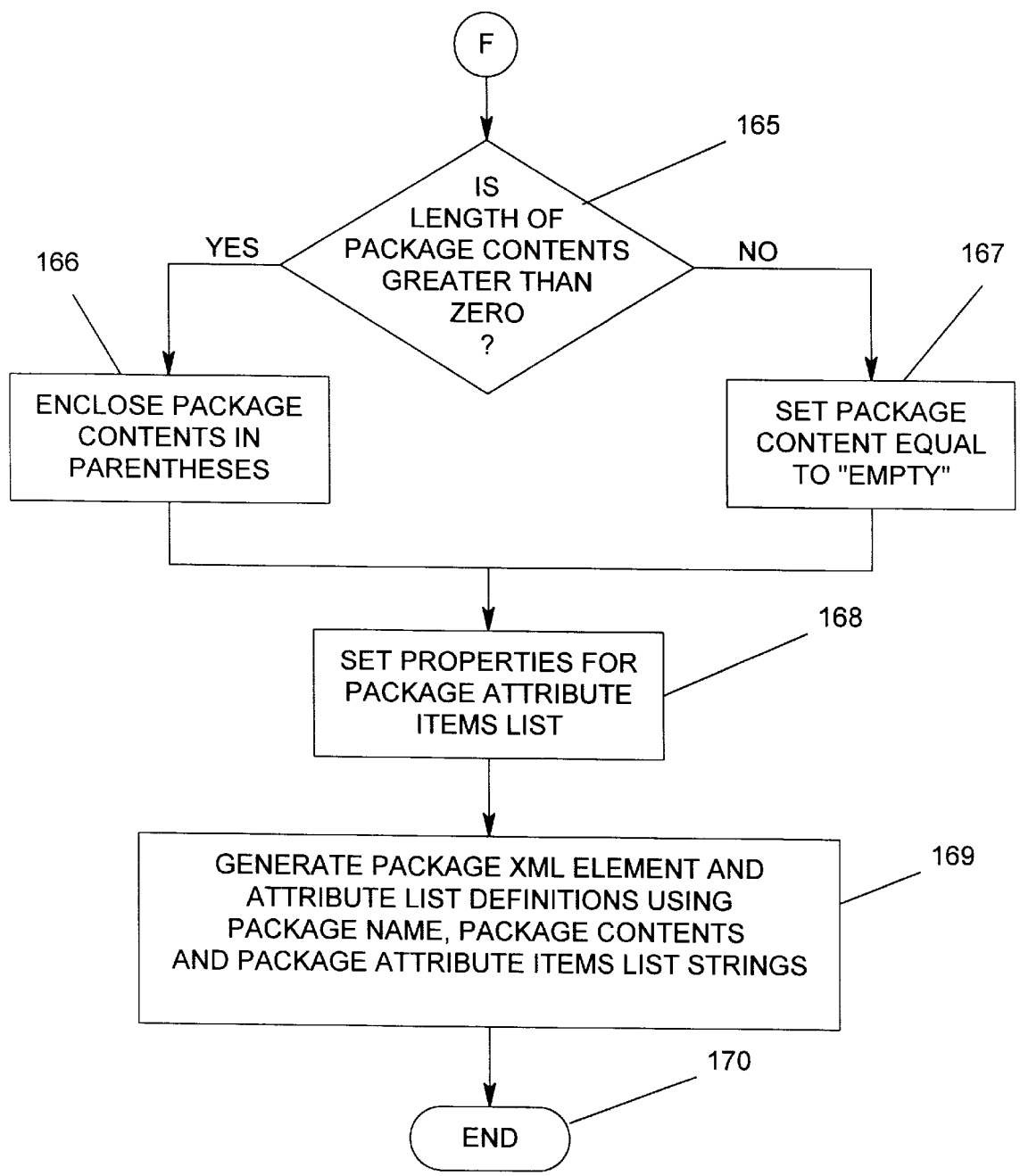

Referring now to FIG. 12C at the connector F, an inquiry is made as to whether or not the length of the package contents are greater than zero (diamond 165). If the answer to this inquiry is yes, then the package contents are enclosed in parentheses (block 166). On the other hand, if the answer to this inquiry is no, then the package content is set equal to "EMPTY" (block 167). Upon completion of either of the steps depicted by the block 166 or 167, properties for the package Attribute items list is set (block 168). After this, the XML element definitions for the package is generated using the package name, package contents and package Attribute list strings (block 169), and the process ends (bubble 170).

Figure 13:
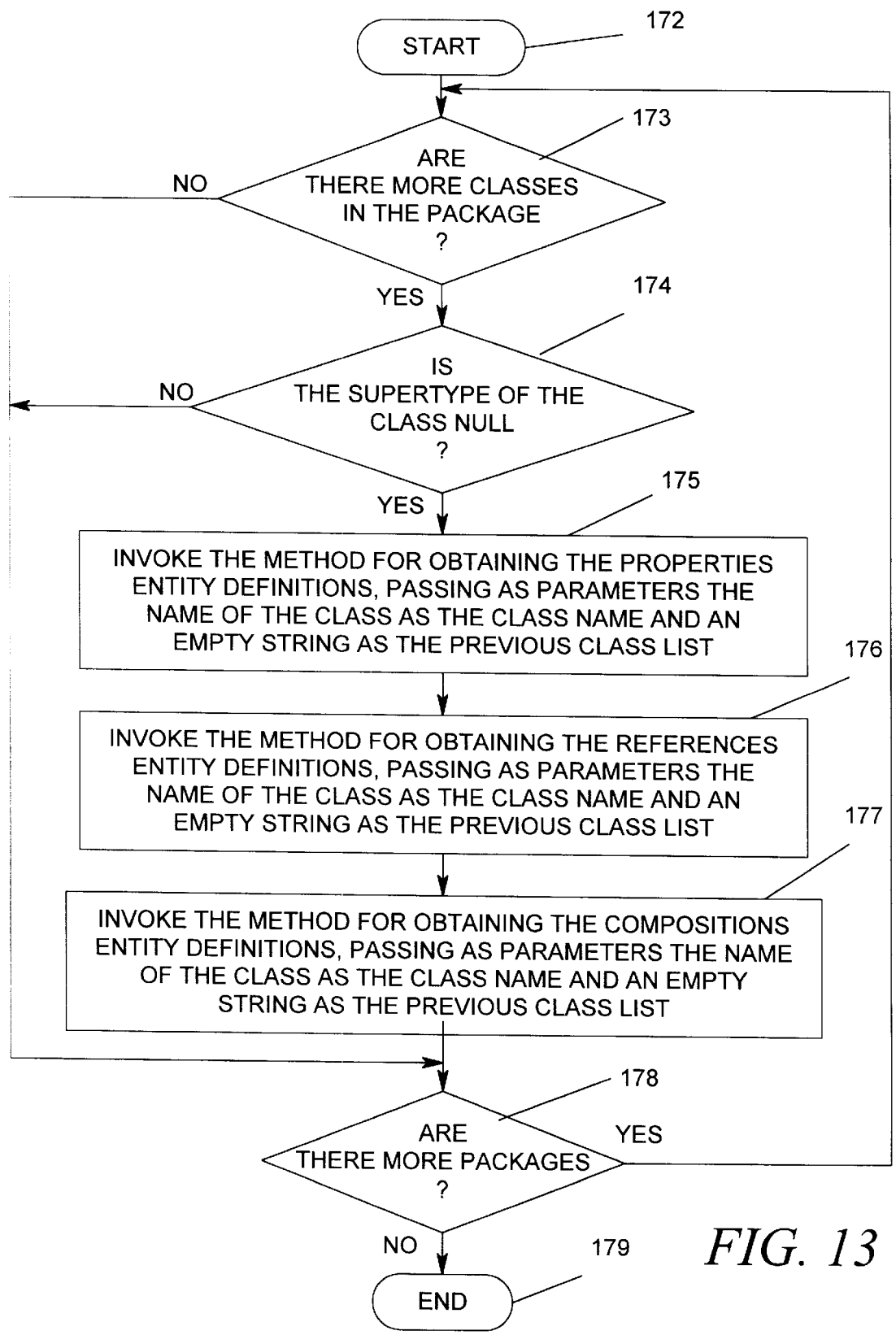
FIG. 13 is a flow chart of the Entity DTD process.

Referring now to FIG. 13, a flow chart of the Entity DTD 27 process is shown. The process begins with a start bubble 172 followed by an inquiry as to whether or not there are more Classes in the Package (diamond 173). If the answer to this inquiry is no, then a branch is made to a latter part of the process and will be explained hereinafter. On the other hand, if the answer to this inquiry is yes, then another inquiry is made as to whether or not the super type, i.e. parent Class of the Class is null (diamond 174). If the answer to this inquiry is no, then a branch is made to a latter part of the process. On the other hand, if the answer is yes, then the method for obtaining the Properties Entity Definitions 32 is invoked, passing as parameters the Class and an empty string as the previous Class list (block 175).

The method for obtaining the References Entity Definitions 33 is next invoked, passing as parameters the Class and an empty string as the previous Class list (block 176). After this, the method for obtaining the Compositions Entity Definitions 31 is invoked, passing as parameters the Class and an empty string as the previous Class list (block 177). It is noted that the processing in blocks 175 through 177 is invoked initially for the topmost Classes in the Class hierarchy in the meta-model and proceeds downward through the Class hierarchy. Another inquiry is then made as to whether or not there are more Packages (diamond 178). If the answer to this inquiry is yes, then a return is made back to the diamond 173. On the other hand, if the answer to this inquiry is no, then the process ends (bubble 179). It is pointed out that if the answer to the inquiry depicted by the diamond 173 or the diamond 174 is no, then the branch made is to the diamond 178.

Figure 14A:
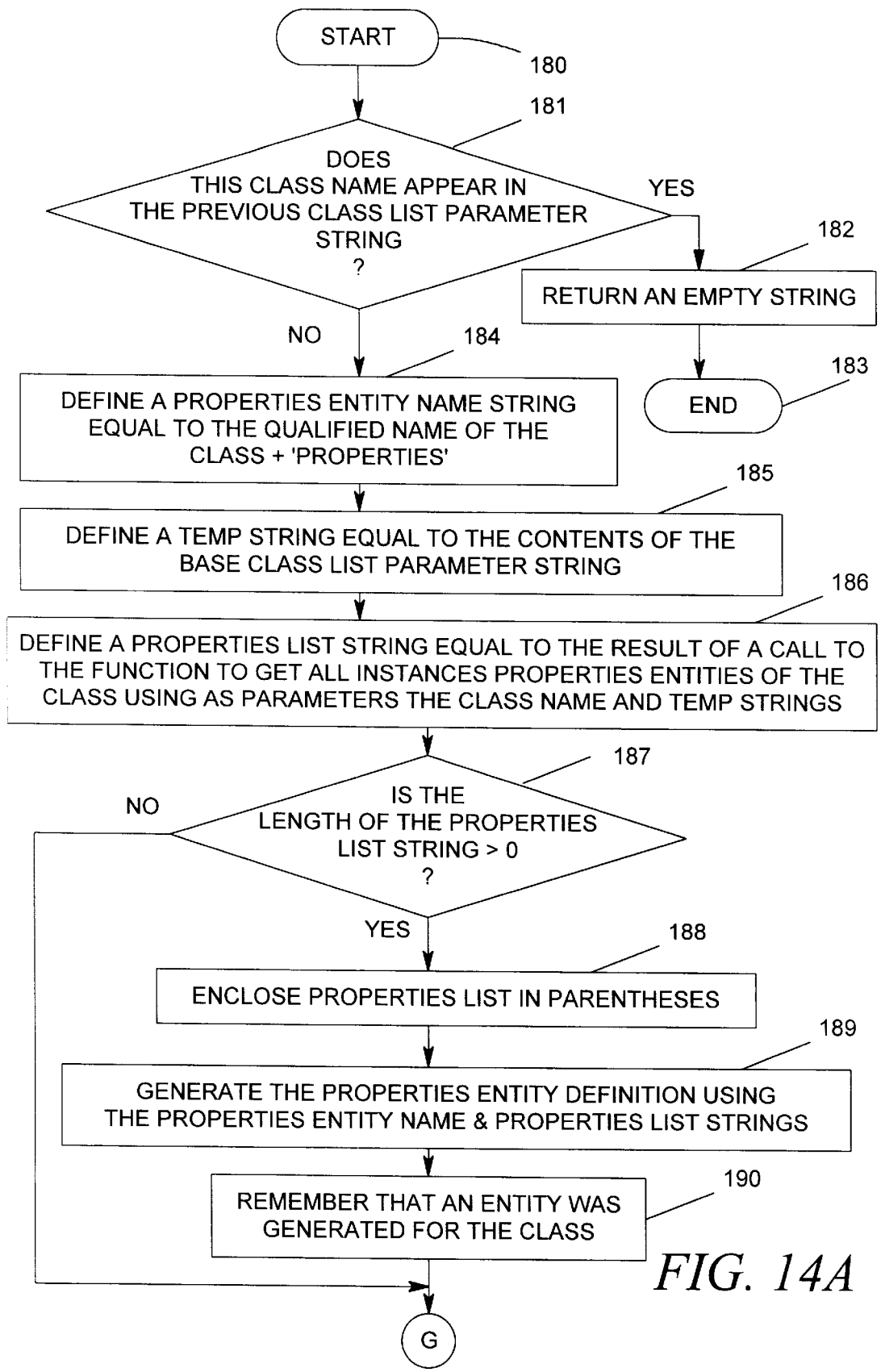
FIGS. 14A and 14B combined form a flow chart of the Properties Entities definition process.

Referring now to FIG. 14A, the first of a two-sheet flow chart of the Properties Entities Definitions 32 process is illustrated. The process begins with a start bubble 180 followed by an inquiry as to whether or not the name this Class appears in the previous Class list parameter string (diamond 181). If the answer to this inquiry is yes, then an empty string is returned (block 182) and the process ends (bubble (183). On the other hand, if the answer to this inquiry is no, then a properties entity name string is defined equal to the qualified name of the Class plus "Properties" (block 184).

After this, a Temp string is defined equal to the contents of the base class list parameter string (block 185) followed by defining a properties list string equal to the result of a call to a sub-process to obtain all instance level Attributes and properties entities using as parameters the class name and temp strings.. This is followed by an inquiry as to whether or not the length of the properties list string is greater than zero (diamond 187). If the answer to this inquiry is yes, then the properties list is enclosed in parentheses (block 188). Next, the XML Properties entity definition is generated using the properties entity name and properties list strings (block 189). The fact that an entity was generated for the Class is remembered (block 190). If the answer to the inquiry depicted by the diamond 187 is no, or upon completion of the step depicted by the block 190, the process illustration continues in FIG. 14B as denoted by a connector G.

Figure 14B:
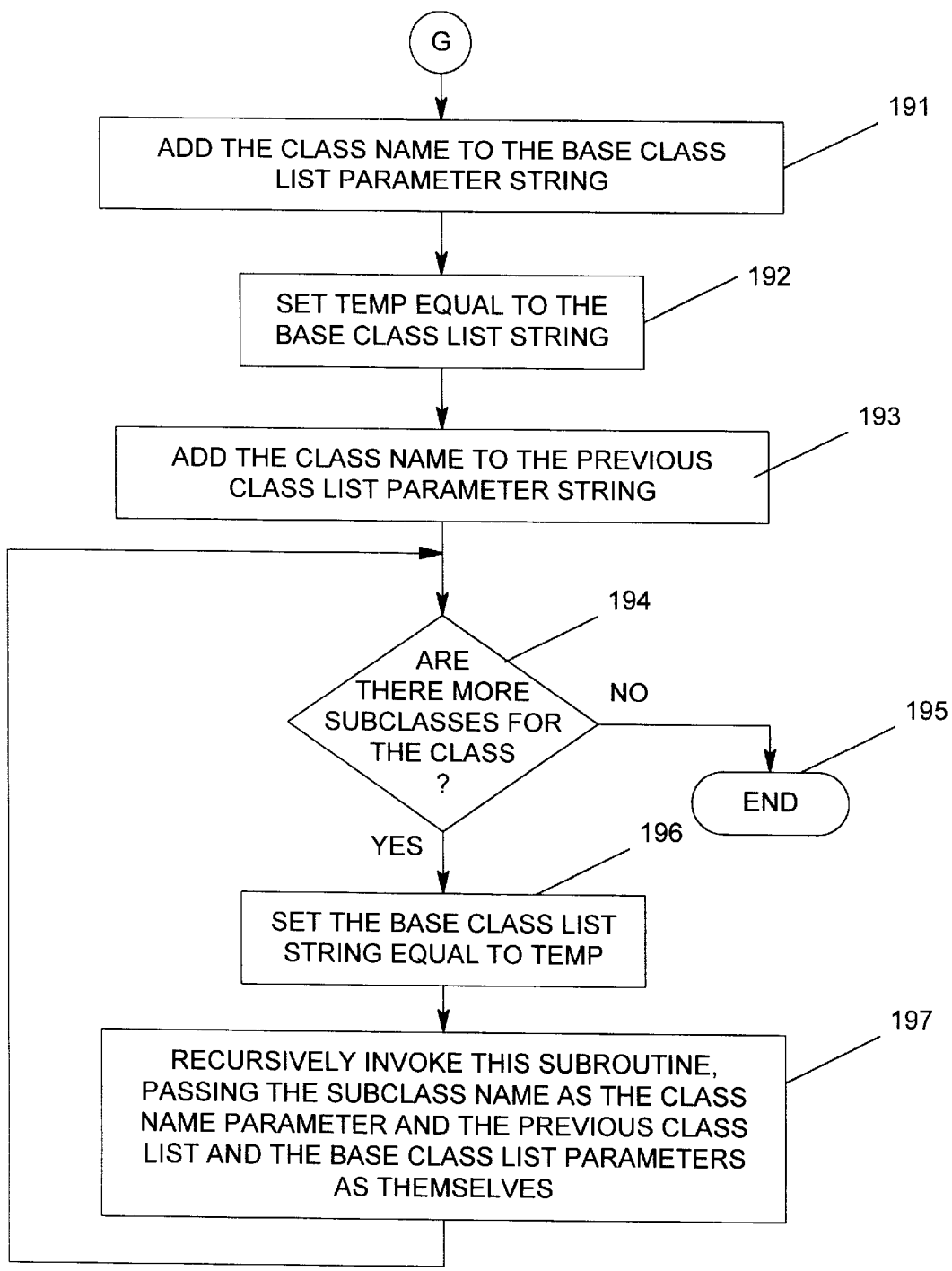

Referring now to FIG. 14B at the connector G, the name of the Class is added to the base Class list parameter string (block 191). Next, the Temp is set equal to the base Class list string (block 192) and the Class name is added to the previous Class list parameter string (block 193). After this, an inquiry is made as to whether or not there are more sub-Classes for the Class (diamond 194). If the answer to this inquiry is no, then the process ends (bubble 195). On the other hand, if the answer to this inquiry is yes, then the base Class list string is restored from the Temp string (block 196), since it will have been modified by any previous recursive calls. Next, the subroutine is recursively invoked, passing the sub-Class and the previous Class list and the base Class lists (block 197). Upon completion of this step, a return is made back to the diamond 194 for processing the next sub-Class for the Class. It is noted that the purpose of the base class string is to insure that in the event of multiple inheritance, only one parent entity is referenced and explicit Attributes are generated for the second and succeeding inheritance paths.

Figure 15A:
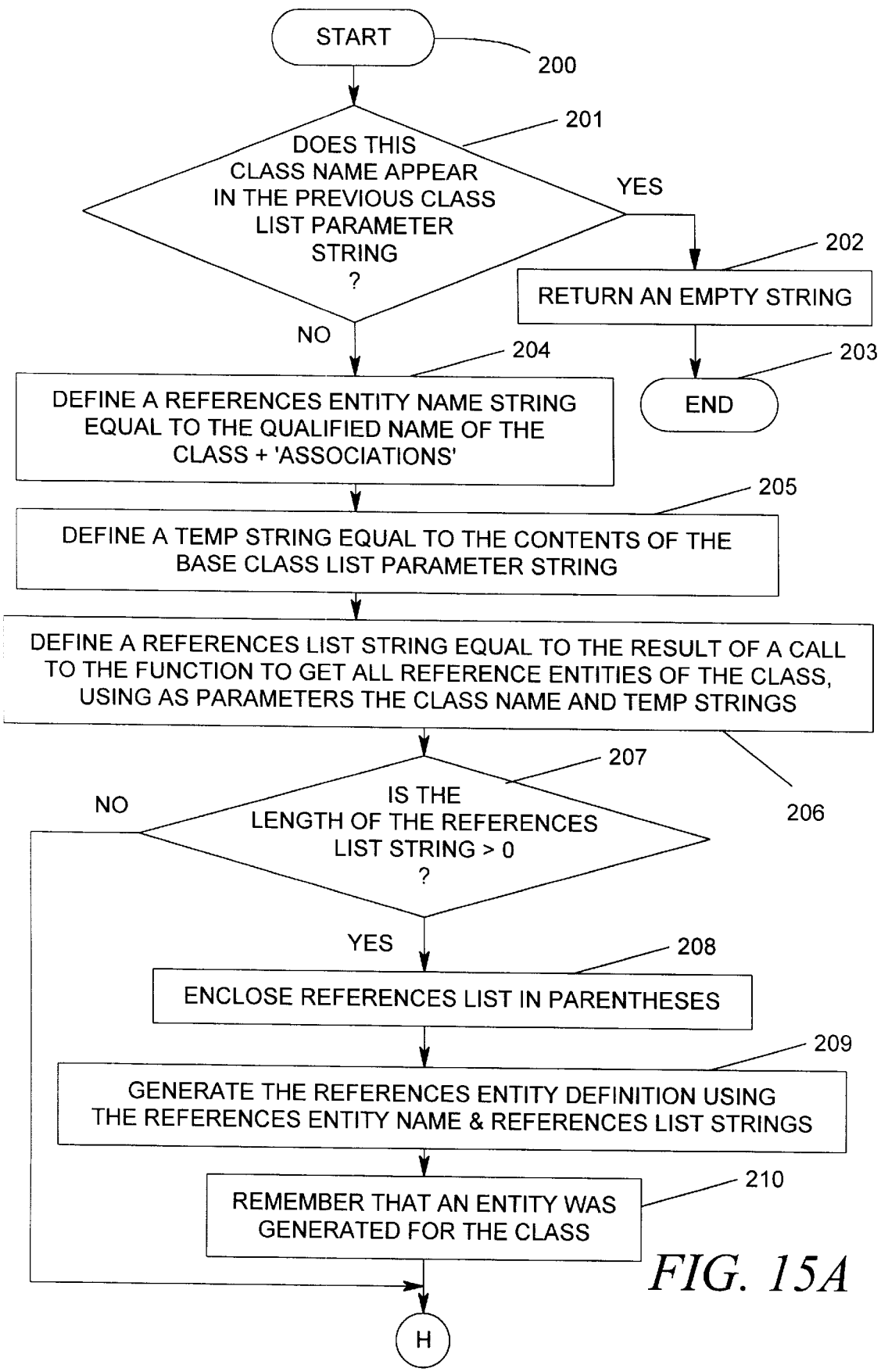
FIGS. 15A and 15B combined form a flow chart of the References Entities definition process.

Referring now to FIG. 15A, a flow chart of the References Entity Definition 33 process is shown. The process begins with a start bubble 200 followed by an inquiry as to whether or not the name of this Class appears in the previous Class list parameter string (diamond 201). If the answer to this inquiry is yes, then an empty string is returned (block 202) and the process ends (bubble 203). On the other hand, if the answer to this inquiry is no, then a references entity name string is defined equal to the qualified name of the Class plus "Associations" (block 204). Next, a Temp string is defined equal to the contents of the base Class list parameter string (block 205), and a references list string is defined equal to the result of a call to a subprocess to obtain all References entities and References for the Class, using as parameters the Class name and Temp strings (block 206). After this, an inquiry is made as to whether or not the length of the references list string is greater than zero (diamond 207).

If the answer to the inquiry depicted by the diamond 207 is yes, then the references list is enclosed in parentheses (block 207). Next, the XML References entity definition is generated using the references entity name and references list strings (block 209), and the fact that an entity was generated for the Class is remembered (block 210). Upon completion of this step, or if the answer to the inquiry depicted by the diamond 207 is no, then the process illustration continues in FIG. 15B as depicted by a connector H.

Figure 15B:
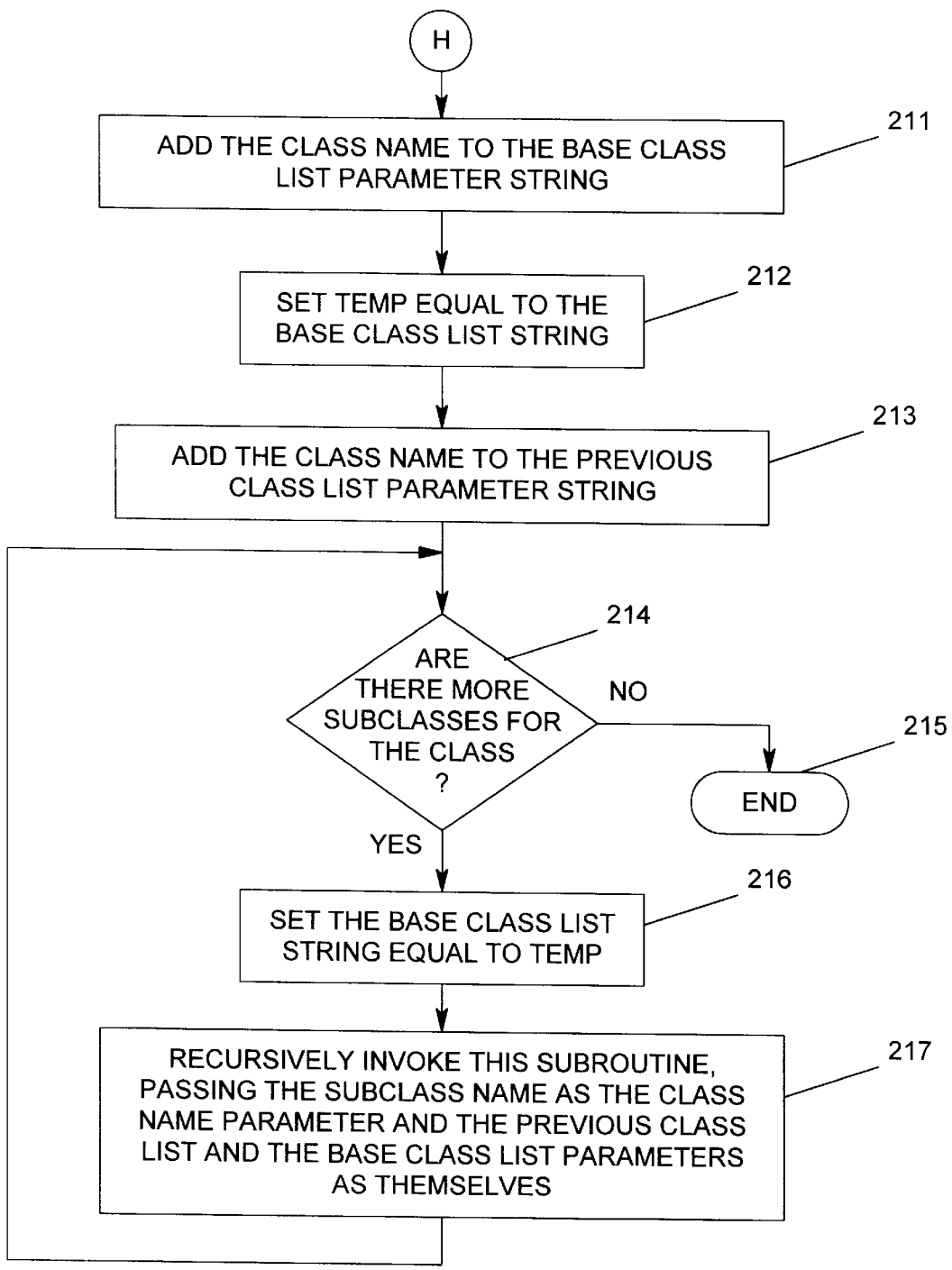

Referring now to FIG. 15B at the connector H, the name of the Class is added to the base Class list parameter string (block 211). Next, Temp is set equal to the previous Class list parameter string (block 212), and the Class name is added to the previous Class list parameter string (block 213). After this, an inquiry is made as to whether or not there are more sub-Classes for the Class (diamond 214). If the answer to this inquiry is no, then the process ends (bubble 215). On the other hand, if the answer to this inquiry is yes, then the base Class list string is restored from the Temp string (block 216), since the base Class list string will have been modified by any previous recursive calls. Next, this process invokes itself recursively, passing the sub-Class and the previous Class list and the base Class lists(block 217). Upon completion of this step a return is made back to the diamond 214).

Figure 16A:
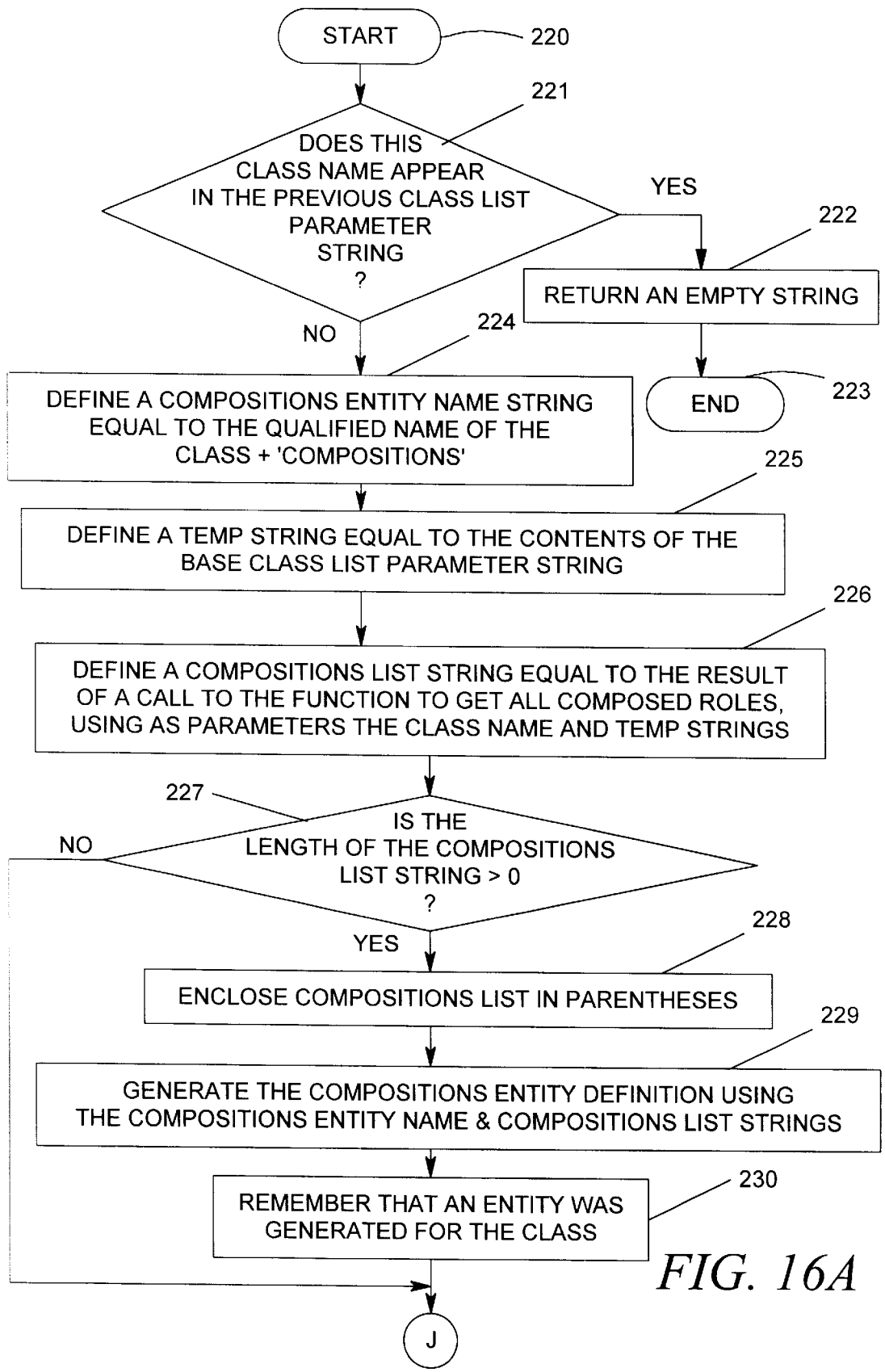
FIGS. 16A and 16B combined form a flow chart of the Compositions Entities definition process.

Referring now to FIG. 16A, a flow chart of the Compositions Entities 31 process is shown. The process begins with a start bubble 220 followed by an inquiry as to whether or not the name of this Class appears in the previous class list parameter string (diamond 221). If the answer to this inquiry is yes, then an empty string is returned (block 222) and the process ends (bubble 223). On the other hand, if the answer to this inquiry is no, then a compositions entity name string is defined equal to the qualified name of the Class plus "Compositions" (block 224). Next, a Temp string is defined equal to the contents of the base Class list parameter string (block 225), and a compositions list string is defined equal to the result of a invoking a process to obtain all composed roles using as parameters the Class name and Temp strings (block 226).

Following the above, an inquiry is made as to whether or not the length of the compositions list string is greater than zero (diamond 227). If the answer to this inquiry is yes, then the compositions list is enclosed in parentheses (block 228). Next, the XML Compositions entity definition is generated using the compositions entity name and compositions list strings (block 229), and the fact that an entity was generated for the Class is remembered. Upon completion of this step, or if the answer to the inquiry depicted by the diamond 22 is no, then a continuation of the process is illustrated in FIG. 16B as denoted by a connector J.

Figure 16B:
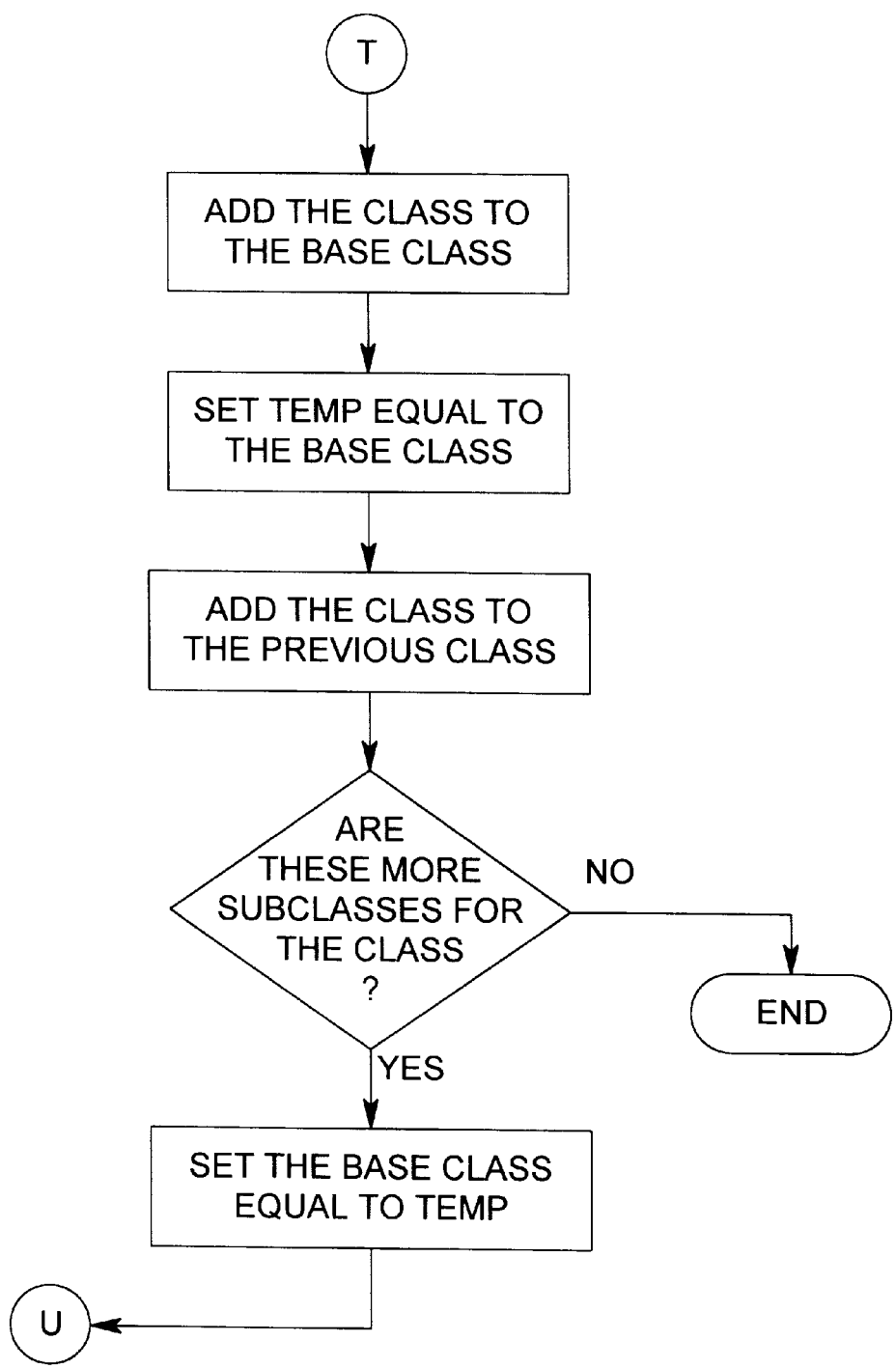

Referring now to FIG. 16B at the connector J, the Class name is added to the base Class list parameter string (block 231). Next, Temp is set equal to the base Class list string (block 232), and the Class name is added to the previous Class list parameter string (block 233). After this, an inquiry is made as to whether or not there are more sub-Classes for the Class (diamond 234). If the answer to this inquiry is no, then the process ends (bubble 235). On the other hand, if the answer to this inquiry is yes, then the base Class list string is restored from the Temp string (block 236), since it will have been modified by any previous recursive calls. This subroutine is then invoked recursively, passing the sub-Class and the previous Class list and the base Class lists (block 237). A return is made back to the diamond 234 to process the next sub-Class for the Class.

Figure 17A:
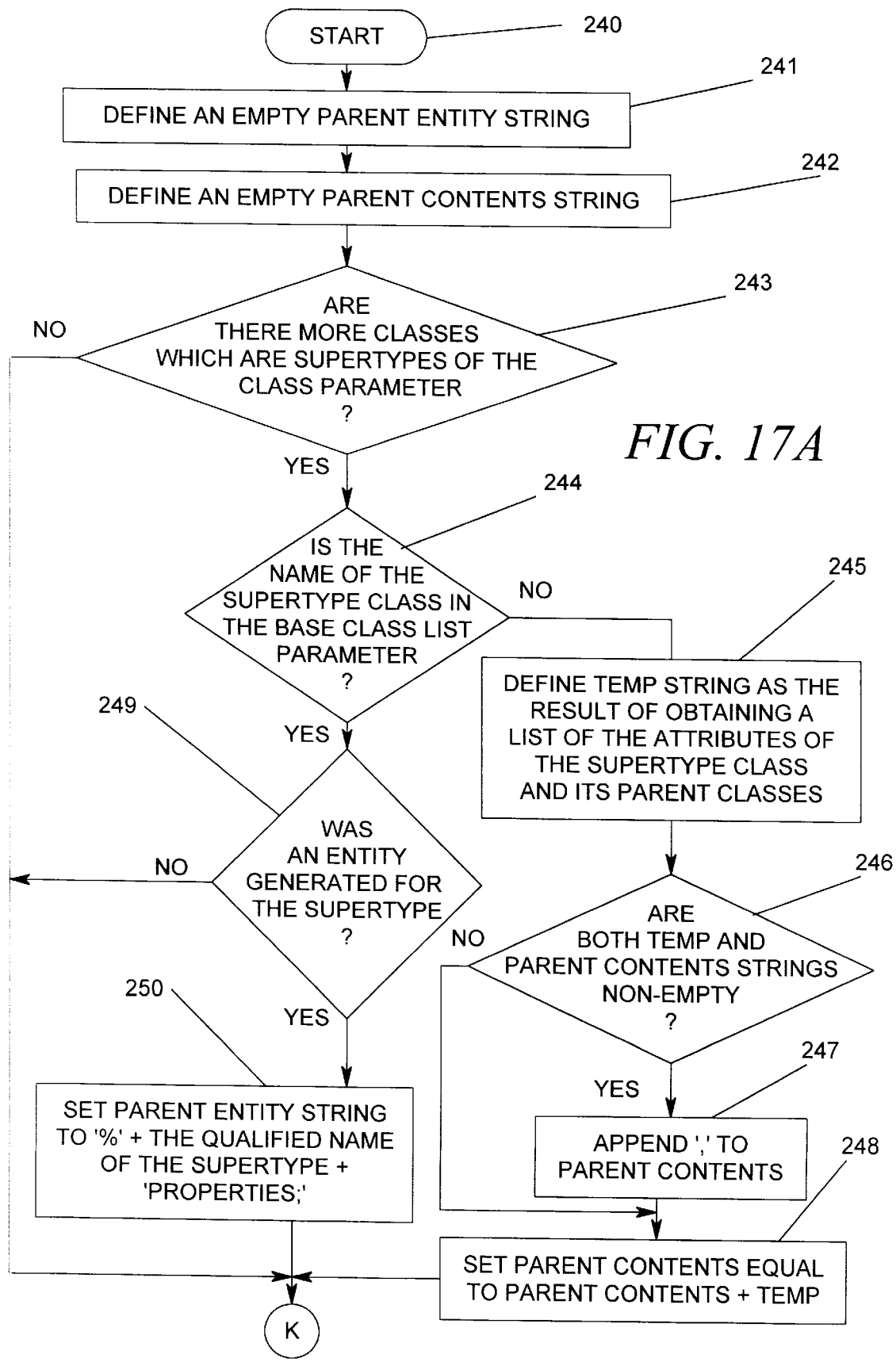
FIGS. 17A and 17B combined form a flow chart of the subprocess of the Properties Entity definition process.

Referring now to FIG. 17A, a flow chart of the subprocess to obtain the Properties entity and all Attributes for a Class is shown. The process begins with a start bubble 240 followed by a step of defining an empty parent entity string (block 241). Next, an empty parent contents string is defined (block 242) followed by an inquiry as to whether or not there are more Classes which are super-types, i.e. parent Classes of the Class parameter (diamond 243). If the answer to this inquiry is yes, then another inquiry is made as to whether or not the name of the super-type Class is in the base Class list parameter (diamond 244). It is noted that the base class list contains the parent Classes of this Class on one and only one inheritance path. If the answer to this inquiry is no, then a Temp string is defined as the result of obtaining a list of the Attributes of the super-type Class and its parent Classes (block 245). Next, an inquiry is made as to whether or not both Temp and parent contents strings are non-empty (diamond 246). If the answer to this inquiry is yes, then a comma "," is appended to the contents (block 247). Upon completion of this step, or if the answer to the inquiry in the diamond 246 is no, then the parent contents are set equal to the parent contents plus Temp (block 248).

If the answer to the inquiry depicted by the diamond 244 is yes, then still another inquiry is made as to whether or not an entity was generated for the super-type (diamond 249). It is noted that the answer to diamond 244 is yes only for one of the possible inheritance paths of the Class. If the answer to this inquiry is yes, then the parent entity string is set to an invocation of the properties entity for the supertype Class: "%" (percent sign) plus the qualified name of the super-type plus "Properties" plus ";" (semicolon) (block 250). Upon completion of this step, or the step depicted by the block 248, or if the answer to either of the inquiries depicted by the diamonds 243 or 249 is no, then the process illustration continues if FIG. 17B as denoted by a connector K.

Figure 17B:
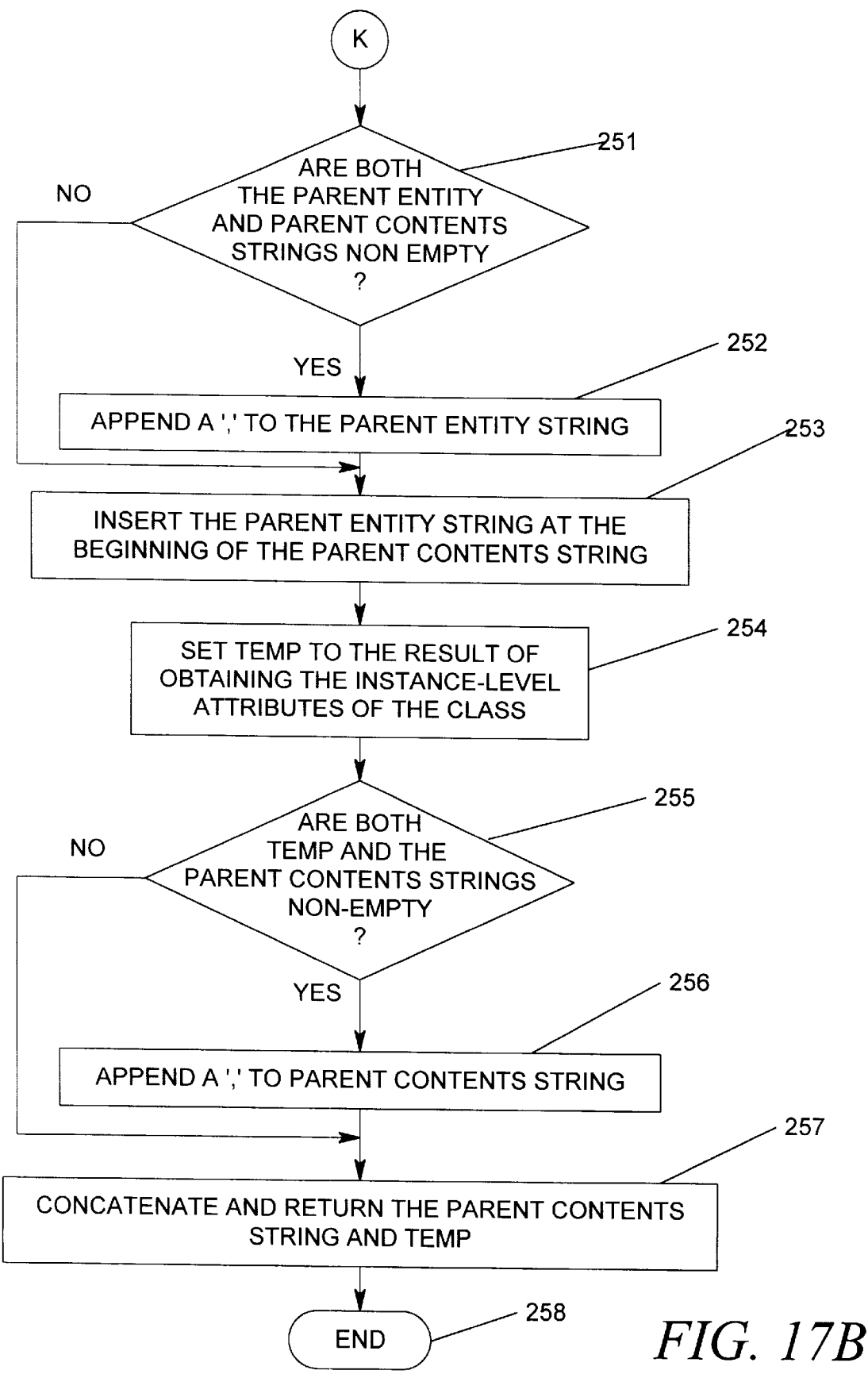

Referring now to FIG. 17B at the connector K, an inquiry is made as to whether or not both the parent entity and parent contents string are non-empty (diamond 251). If the answer to this inquiry is yes, then a comma "," is appended to the parent entity string (block 252), and the parent entity string is inserted at the beginning of the parent contents string (block 253). If the answer to the inquiry depicted by the diamond 251 is no, then a branch is made to the block 253, thereby not appending a comma to the parent entity string. Next, Temp is set to the result of obtaining the instance level Attributes of the Class (block 254). After this, another inquiry is made as to whether or not both Temp and the parent contents strings are both non-empty (diamond 255).

If the answer to the inquiry depicted by the diamond 255 is yes, then a comma "," is appended to the parent contents string (block 256), and the parent contents string and Temp are concatenated and returned (block 257) after which the process ends (bubble 257). If the answer to the inquiry depicted by the diamond 255 is no, then no comma is appended the parent contents string (i.e., the block 256 is bypassed).

Figure 18A:
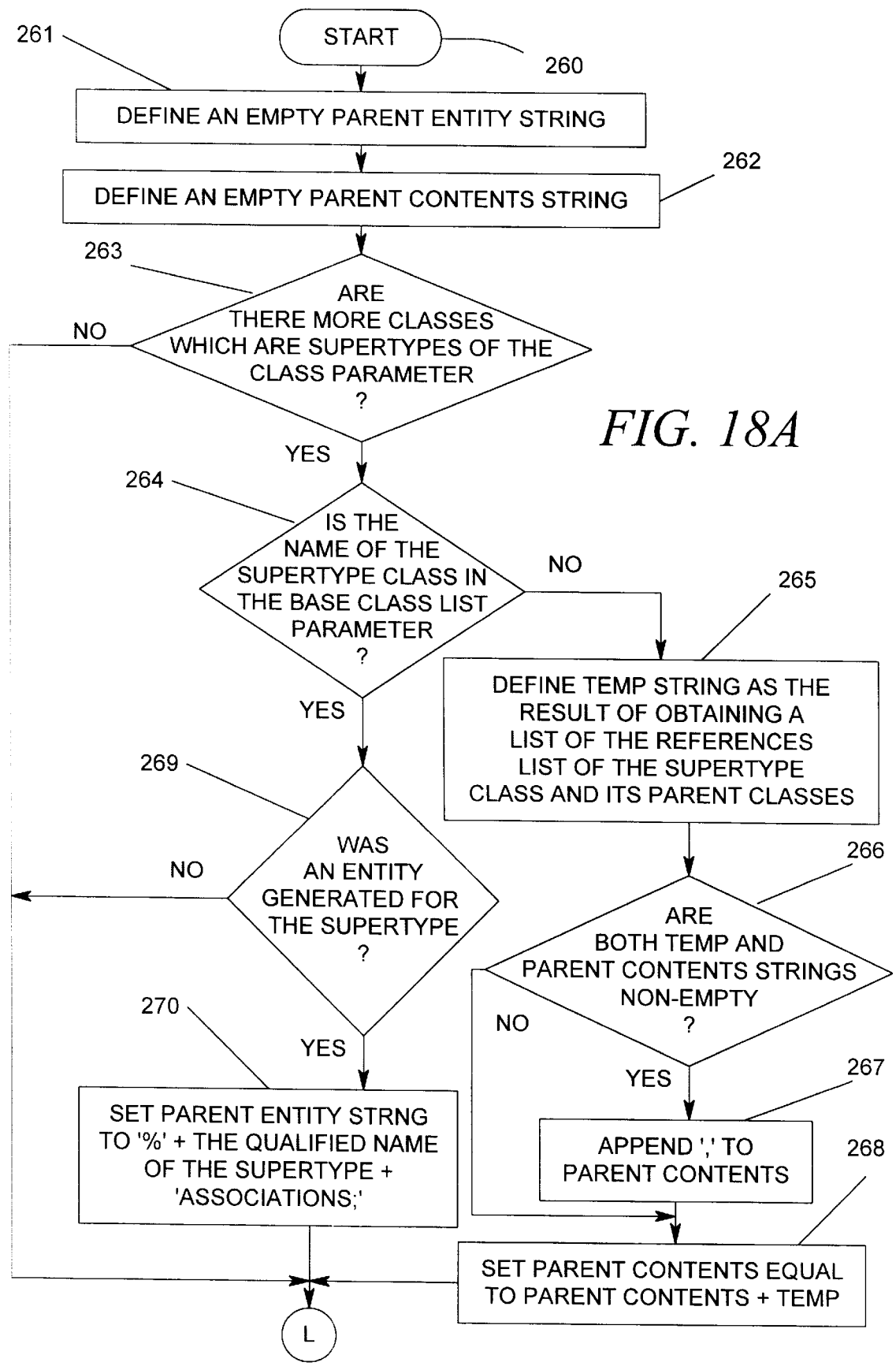
FIGS. 18A and 18B combined form a flow chart of the subprocess of the References Entity definition process.

Referring now to FIG. 18A, a flow chart of the subprocess to obtain the References Entity and all References for a Class is shown. The process begins with a start bubble 260 followed by a step of defining an empty parent entity string (block 261). Next, an empty parent contents string is defined (block 262) followed by an inquiry as to whether or not there are more Classes which are super-types, i.e. parent Classes of the Class parameter (diamond 263). If the answer to this inquiry is yes, then another inquiry is made as to whether or not the name of the super-type Class is in the base Class list parameter (diamond 264). It is noted that the base class list contains the parent Classes of this Class on one and only one inheritance path. If the answer to this inquiry is no, then a Temp string is defined as the result of obtaining the References of the super-type Class and its parent Classes (block 265). Next, an inquiry is made as to whether or not both Temp and parent contents strings are non-empty (diamond 266). If the answer to this inquiry is yes, then a comma "," is appended to the contents (block 267). Upon completion of this step, or if the answer to the inquiry in the diamond 246 is no, then the parent contents are set equal to the parent contents plus Temp (block 268).

If the answer to the inquiry depicted by the diamond 264 is yes, then still another inquiry is made as to whether or not an entity was generated for the super-type (diamond 269). If the answer to this inquiry is yes, then the parent entity string is set to "%" (percent sign) plus the qualified name of the super-type plus "References" plus ";" (block 270). Upon completion of this step, or the step depicted by the block 268, or if the answer to either of the inquiries depicted by the diamonds 263 or 269 is no, then the process illustration continues in FIG. 18B as denoted by a connector L.

Figure 18B:
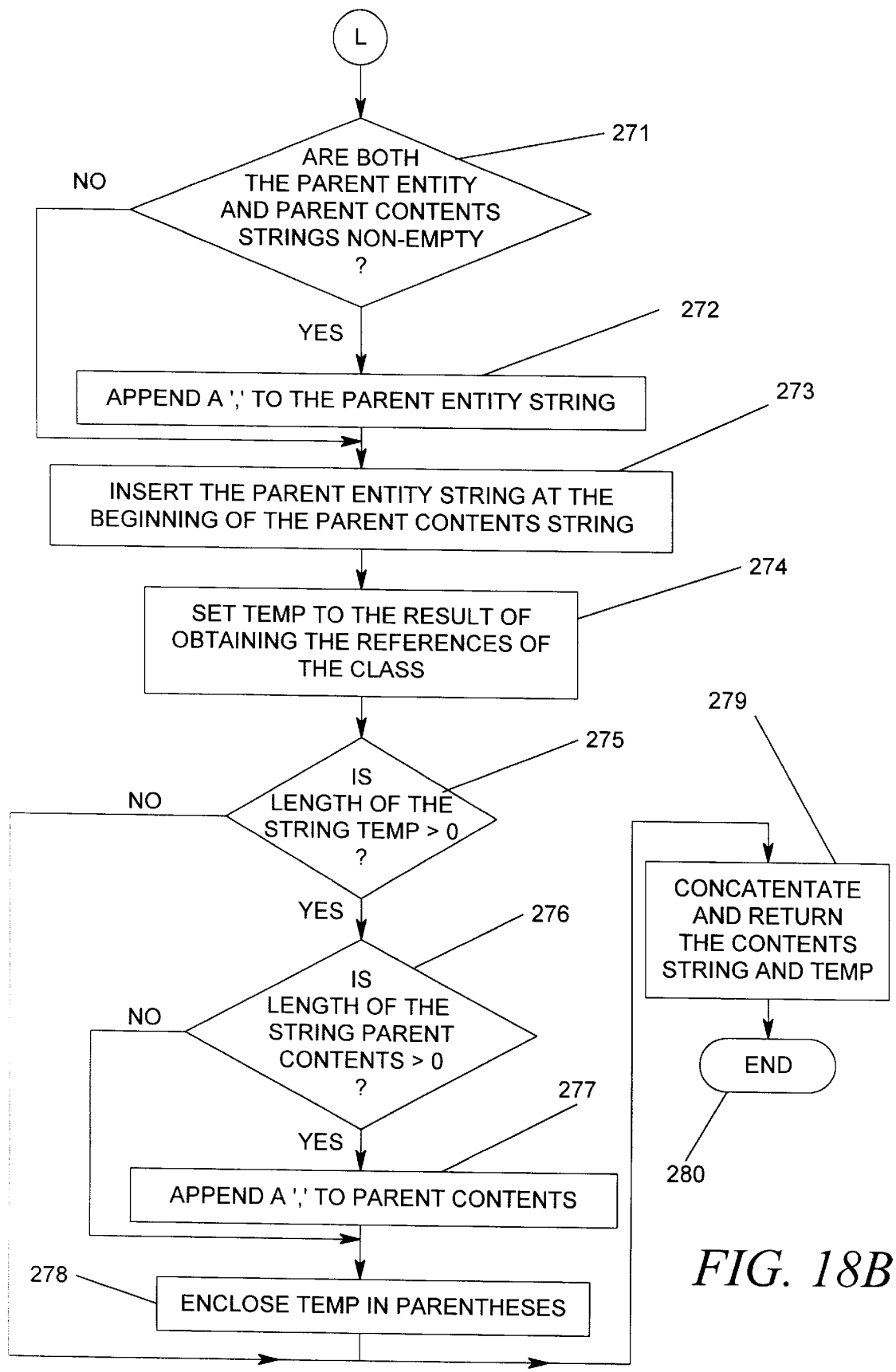

Referring now to FIG. 18B at the connector L, an inquiry is made as to whether or not both the parent entity and parent contents strings are non-empty (diamond 271). If the answer to this inquiry is yes, then a comma "," is appended to the parent entity string (block 272), and the parent entity string is inserted at the beginning of the parent contents string (block 273). If the answer to the inquiry depicted by the diamond 271 is no, then a branch is made to the block 273, thereby not appending a comma to the parent entity string. Next, Temp is set to the result of obtaining the References the Class (block 274). After this, another inquiry is made as to whether or not the length of the string Temp is greater than zero (diamond 275).

If the answer to the inquiry depicted by the diamond 275 is yes, then yet another inquiry is made as to whether or not the length of the string parent contents is greater than zero (diamond 276). If the answer to this inquiry is yes, then a comma "," is appended to the parent contents (block 277), and Temp is enclosed in parentheses (block 278). If the answer to the inquiry depicted by the diamond 276 is no, then no comma is appended the parent contents (i.e., the block 277 is bypassed). If the answer to the inquiry in the diamond 275 is no, or after Temp is enclosed in parentheses (block 278) then the contents string and Temp are concatenated and returned (block 279) and the process ends (bubble 280).

Figure 19A:
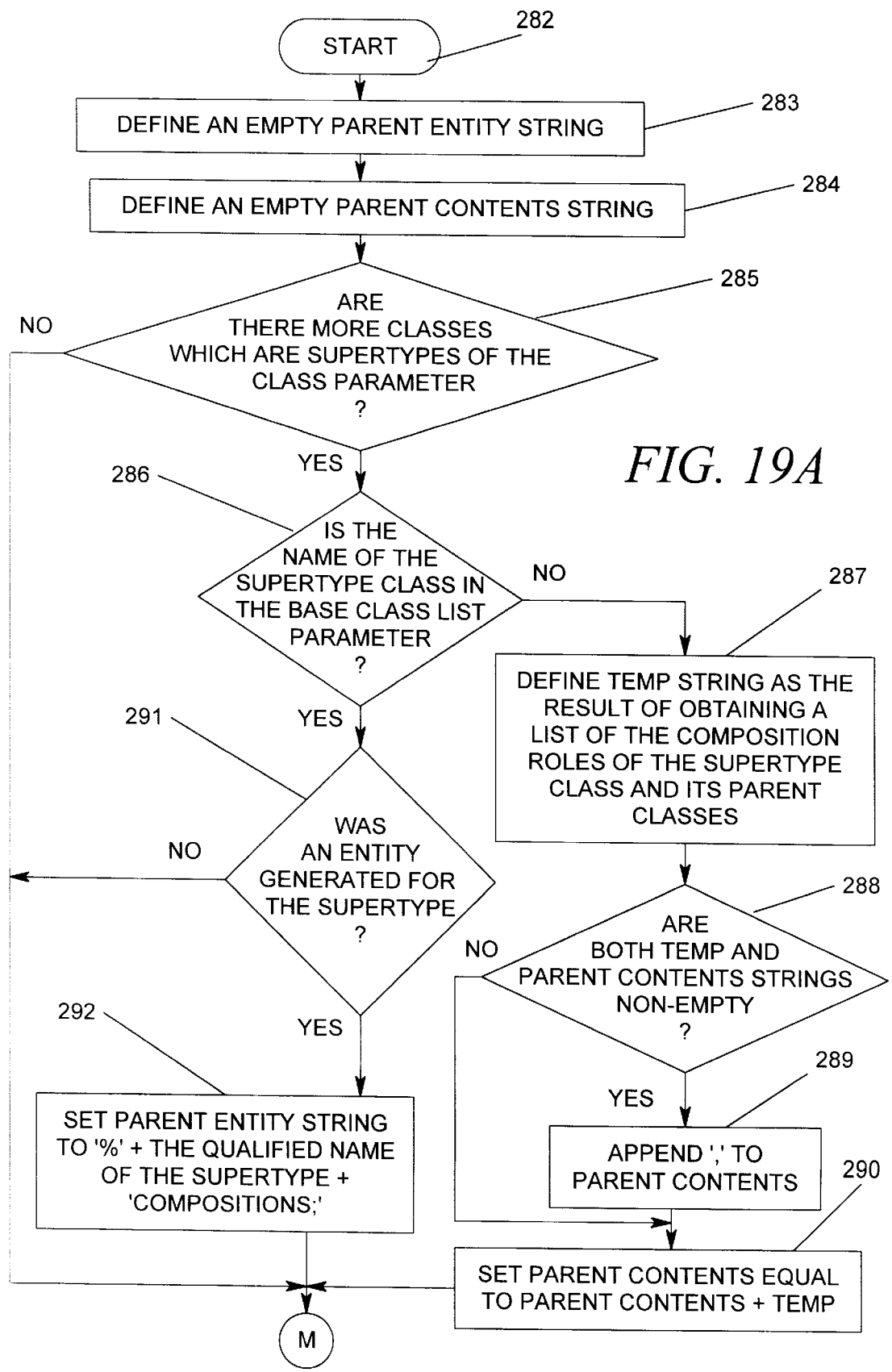
FIGS. 19A and 19B combined form a flow chart of the subprocess of the Compositions Entity definition process.

Referring now to FIG. 19A, a flow chart of the subprocess to obtain the Compositions Entity and all composed roles for a Class is shown. The process begins with a start bubble 282 followed by a step of defining an empty parent entity string (block 283). Next, an empty parent contents string is defined (block 284) followed by an inquiry as to whether or not there are more Classes which are super-types of the Class parameter (diamond 285). If the answer to this inquiry is yes, then another inquiry is made as to whether or not the name of the super-type Class is in the base Class list parameter (diamond 286). It is noted that the base class list contains the parent Classes of this Class on one and only one inheritance path. If the answer to this inquiry is no, then a Temp string is defined as the result of obtaining a list of the Composition Roles of the super-type Class and its parent Classes (block 287). Next, an inquiry is made as to whether or not both Temp and parent contents strings are non-empty (diamond 288). If the answer to this inquiry is yes, then a comma "," is appended to the contents (block 289). Upon completion of this step, or if the answer to the inquiry in the diamond 288 is no, then the parent contents are set equal to the parent contents plus Temp (block 290).

If the answer to the inquiry depicted by the diamond 286 is yes, then still another inquiry is made as to whether or not an entity was generated for the super-type (diamond 291). If the answer to this inquiry is yes, then the parent entity string is set to "%" (percent sign) plus the qualified name of the super-type plus "Compositions" plus ";" (block 292). Upon completion of this step, or the step depicted by the block 290, or if the answer to either of the inquiries depicted by the diamonds 285 or 291 is no, then the process illustration continues in FIG. 19B as denoted by a connector M.

Figure 19B:
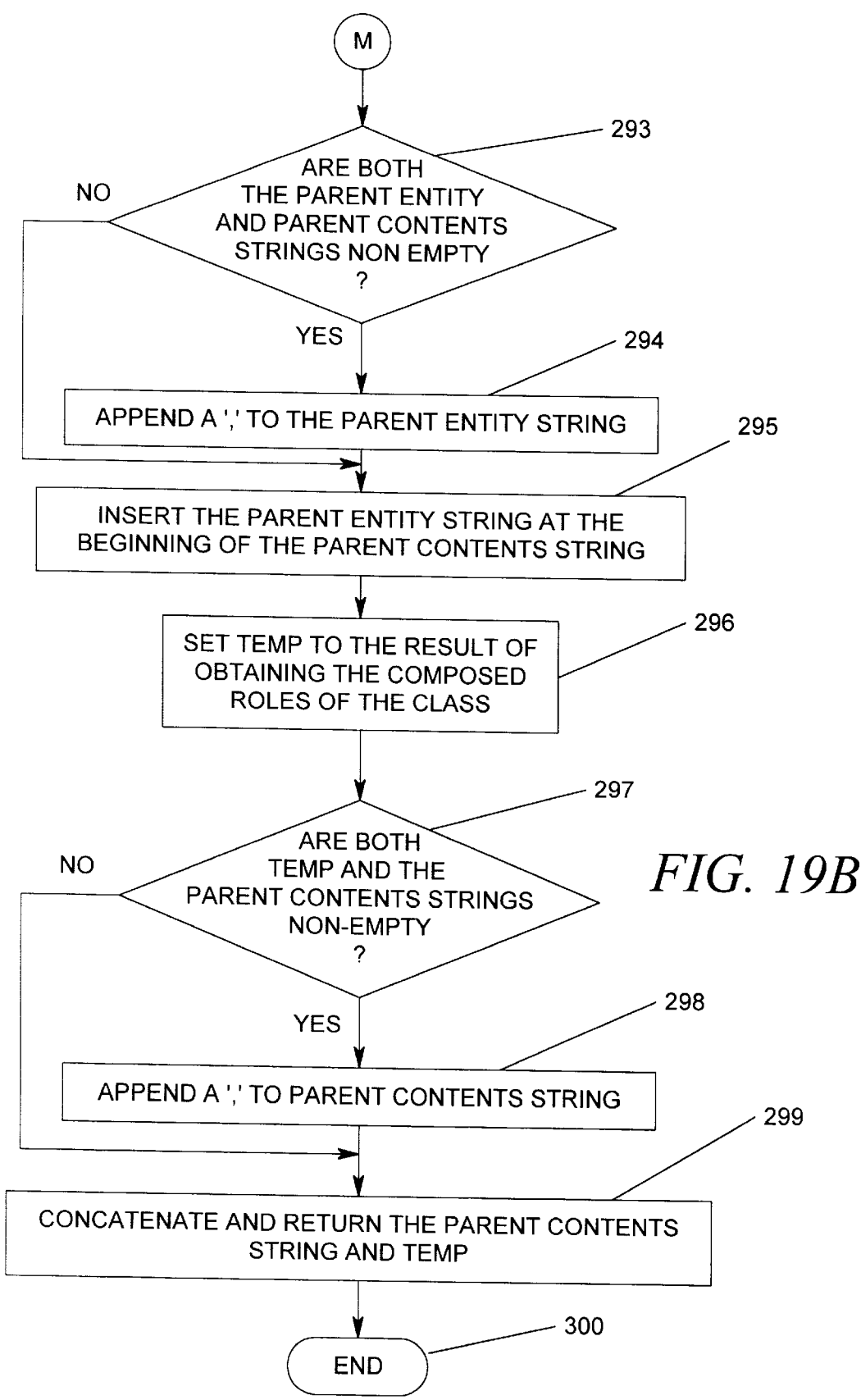

Referring now to FIG. 19B at the connector M, an inquiry is made as to whether or not both the parent entity and parent contents string are non-empty (diamond 293). If the answer to this inquiry is yes, then a comma "," is appended to the parent entity string (block 294), and the parent entity string is inserted at the beginning of the parent contents string (block 295). If the answer to the inquiry depicted by the diamond 293 is no, then a branch is made to the block 295, thereby not appending a comma to the parent entity string. Next, Temp is set to the result of obtaining the composed roles of the Class (block 296). After this, another inquiry is made as to whether or not both Temp and the parent contents strings are both non-empty (diamond 297).

If the answer to the inquiry depicted by the diamond 297 is yes, then a comma "," is appended to the parent contents string (block 298), and the parent contents string and Temp are concatenated and returned (block 299) after which the process ends (bubble 300). If the answer to the inquiry depicted by the diamond 297 is no, then no comma is appended the parent contents string (i.e., the block 298 is bypassed).

Auxiliary functions are required for several purposes, among which are the recursive procedures to manage inheritance and for XML details. The code for implementing the auxiliary functions is set forth in Exhibit A hereof.

These functions illustrate possible methods to perform the textual manipulations necessary to insure that the formatting of the XML definitions is correct. They also illustrate possible methods to obtain lists of Attributes, Classes, etc., where Class or Package inheritance is involved. While these functions can be used to perform the indicated operation, they are not necessarily the only means of so doing.

The GetParentAttributes3 function takes a Class and a list of base Class names as parameters and is used to obtain a list of the Attributes of a Class and its parent Classes, but only up to the point where a parent Class name appears in the list of base Class names. If the name of the parameter Class appears in the list of base Class names, then the function returns an empty string. Otherwise, the function calls itself recursively for each of the immediate parent Classes of the parameter Class, passing the parent Class and the base Class names list as parameters. The list of base Class names is thus used to prevent the multiple appearance of parent Class Attributes in the event that a multiple inheritance paths exist from a base Class to the parameter Class. A comma (",") is appended to any nonempty results returned. After the parent Class Attributes have been obtained, the function then calls GetAttributes to obtain the comma-separated list of the Attributes of the parameter Class itself and appends it to the the list of parent Class Attributes. It then returns the result, which is a comma-separated list of the Attributes of the Class and its parent Classes, with no duplicates.

The GetParentReferences3 function takes a Class and a list of base Class names as parameters and is used to obtain a list of the non-composed References of a Class and its parent Classes, but only up to the point where a parent Class name appears in the list of base Class names. If the name of the parameter Class appears in the list of base Class names, then the function returns an empty string. Otherwise, the function calls itself recursively for each of the immediate parent Classes of the parameter Class, passing the parent Class and the base Class names list as parameters. The list of base Class names is thus used to prevent the multiple appearance of parent Class non-composed References in the event that a multiple inheritance paths exist from a base Class to the parameter Class. A comma (",") is appended to any nonempty results returned. After the parent Class Attributes have been obtained, the function then calls GetReferences to obtain the comma-separated list of the non-composed References of the parameter Class itself and appends it to the list of parent Class non-composed References. It then returns the result, which is a comma-separated list of the non-composite References of the Class and its parent Classes, with no duplicates.

The GetParentComposedRoles3 function takes a Class and a list of base Class names as parameters and is used to obtain a list of the composed References of a Class and its parent Classes, but only up to the point where a parent Class name appears in the list of base Class names. If the name of the parameter Class appears in the list of base Class names, then the function returns an empty string. Otherwise, the function calls itself recursively for each of the immediate parent Classes of the parameter Class, passing the parent Class and the base Class names list as parameters. The list of base Class names is thus used to prevent the multiple appearance of parent Class composed References in the event that a multiple inheritance paths exist from a base Class to the parameter Class. A comma (",") is appended to any nonempty results returned. After the parent Class Attributes have been obtained, the function then calls GetReferences to obtain the comma-separated list of the composed References of the parameter Class itself and appends it to the the list of parent Class composed References. It then returns the result, which is a comma-separated list of the composed References of the Class and its parent Classes, with no duplicates.

The GetReferenceMultiplicity auxiliary function takes a Reference as a parameter and returns the proper XML multiplicity specifier for the Reference.

The GetContainedClasses auxiliary function takes two parameters, a Class and a list of the names of previously visited Classes. It recursively calls itself to get the Classes contained in all parent Class(es) of the parameter Class, using the previous Classes list to avoid visiting the same parent Class more than once. It then appends to this list the names of the Classes contained within the parameter Class itself. It encloses the result in parentheses ("( )") and appends an XML multiplicity of "*".

The GetClasses auxiliary function takes two parameters, Class and a list of the names of previously-visited classes, and is used whenever it is necessary to list all of the possible Classes to which an operation should apply. It puts the name of the parameter Class into the result and then calls itself recursively to append the Class names of each sub-Class, if any, of the parameter Class, using the previous classes list to avoid visiting the same sub-Class more than once. It separates the names of the Classes with the XML alternative indication, the vertical bar ("|").

The GetClassLevelAttributes auxiliary function takes a Package as a parameter and is used to obtain a list of all classifier level Attributes of all Classes, which might appear in the Package. It calls itself recursively to obtain the classifier level Attributes of its parent Package(s), if any. It then calls the GetAttributes function for each Class of the parameter Package to obtain the list of classifier Attributes of said Class and combines this list with the list of those from the parent Packages.

The GetNestedClassLevelAttributes auxiliary function takes a Package as a parameter and is used to obtain a list of all classifier level Attributes of all Classes which might appear in the Package or in any Package nested within it. It creates the list of the classifier level Attributes of the Classes of the parameter Package itself and then calls itself recursively to obtain this information for the Packages nested within it.

The GetPackageClasses auxiliary function takes a Package as a parameter and is used to obtain a list of the names of all of the Classes in the parameter Package and all of the Packages from which it is derived, or in which it is contained. It calls itself recursively to obtain the package Classes for its parent or containing Packages and then appends to this list the names of the Classes in the parameter Package itself.

The GetContainedPackages auxiliary function takes a Package as a parameter and is used to obtain a list of the names of the Packages contained in the parameter Package and its parent Packages. It calls itself recursively to obtain this information for its parent Packages and then appends the names of the Packages that it contains.

The GetUnreferencedAssociations auxiliary function takes a Package as a parameter and is used to obtain a list of the names of the unreferenced Associations, if any, of the parameter Package and its parent Packages. An unreferenced Association is one in which neither of the AssociationEnds of the Association is referred to by a Reference. This function calls itself recursively to obtain this information for its parent Packages and then appends the names of the unreferenced Associations of the parameter Package itself.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

Exhibit A

```
GetParentAttributes3
Function GetParentAttributes3(in cls: Class, in baseCls: String) :
Return String
    If cls is in baseCls Then
        Return the empty string ('')
    End
    Set parentContents := ''
    For each Class referenced by cls.supertype Do
        Set temp := GetParentAttributes3(cls.supertype, baseCls)
        If Length(temp) > 0 and Length(parentContents) > 0 Then
            Set parentContents := parentContents + ','
        End
        Set parentContents := parentContents + temp
    End
    Set temp := GetAttributes(cls, 'instance')
    If Length(temp) > 0 and Length(parentContents > 0) Then
        Set parentContents := parentContents + ','
    End
    Return parentContents + temp
End
GetParentReferences3
Function GetParentReferences3(in cls: Class, in baseCls: String) :
Return String
    If cls is baseCls Then
        Return the empty string ('')
    End
    Set parentContents := ''
    For each Class referenced by cls.supertype Do
        Set temp := GetParentReferences3(cls.supertype, baseCls)
        IfLength(temp) > 0 and Length(parentContents) > 0 Then
            Set parentContents := parentContents + ','
        End
        Set parentContents := parentContents + temp
    End
    Set temp := GetReferences(cls)
    If Length(temp) > 0 and Length(parentContents > 0) Then
        Set parentContents := parentContents + ','
    End
    Return parentContents + temp
End
GetParentCompositionRoles3
Function GetParentCompositionRoles3(in cls: Class, in baseCls: String) :
Return String
    If cls is in baseCls Then
        Return the empty string ('')
    End
    Set parentContents := ''
    For each Class referenced by cls.supertype Do
        Set temp := GetParentCompositionRoles3(cls.supertype,
        baseCls)
        If Length(temp) > 0 and Length(parentContents) > 0 Then
            Set parentContents := parentContents + ','
        End
        Set parentContents := parentContents + temp
    End
    Set temp := GetCompositionContents(cls)
    If Length(temp) > 0 and Length(parentContents > 0) Then
        Set parentContents := parentContents + ','
    End
    Return parentContents + temp
End
GetReferenceMultiplicity
Function GetReferenceMultiplicity(in ref:Reference) Returns String
    If Ref.referencedEnd.multiplicity is "0..1" Or
            Ref.referencedEnd.aggregation is composite Then
        Set m := '?'
    Else If Ref.referencedEnd.multiplicity is "1..*" Then
        Set m := '+' (or '*' for a relaxed DTD)
    Else If Ref.referencedEnd.multiplicity is not "1..1" Then
        Set m := '*'
    Else
        Set m := '' (or '?' for a relaxed DTD)
    End
    Return m
End
GetContainedClasses
Function GetContainedClasses(in cls : Class, inout previousCls : String)
Returns String
    If cls appears in previousCls, return the empty string
    Set parentClasses := ''
    For each parent Class of cls Do
```

-continued

Exhibit A

```
        Set temp := GetContainedClasses(parent Class)
        If Length(parentClasses) > 0 and Length(temp) > 0 Then
            Set parentClasses := parentClasses + ','
        End
        Set parentClasses := parentClasses + temp
    End
    Set classes := ''
    For Each Class contained in cls Do
        Set Temp := Qualified name of the contained Class
        If Length(classes) > 0 Then
            Set classes := classes + '|'
        End
        Set classes := classes + Temp
    End
    If Length(classes) > 0 Then
        If Length(parentClasses) > 0 Then
            Set parentClasses := parentClasses + ','
        End
        Set classes = '(' + classes + ')' + '*'
    End
    Add cls to previousCls
    Return parentClasses + classes
End
GetClasses
Function GetClasses(in cls : Class, inout prevCls) Returns String
    If cls appears in prevCls, return the empty string ('')
    Set rslt := the qualified name of cls
    For Each subclass of cls Do
        Set Temp := GetClasses(the subclass, prevCls)
        If (Length(Temp) > 0) Then
            Set rslt := rslt + '|'
        End
        Set rslt := rslt + Temp
    End
    Add cls to prevCls
    Return rslt
End
GetClassLevelAttributes
Function GetClassLevelAttributes(in pkg : Package) Returns String
    If pkg has a parent or containing Package Then
        Set parentAtts := GetClassLevelAttributes(parent Package)
    End
    Set atts := ''
    For Each Class of pkg Do
        Set temp := GetAttributes(the Class,'classifier')
        If Length(temp) > 0 And Length (atts) > 0) Then
            Set atts := atts + '|'
        End
        Set atts := atts + temp
    End
    If Length(atts) > 0) then
        If Length(parentAtts) > 0 Then
            Set parentAtts := parentAtts + ','
        End
        Set atts := '(' + atts + ')'
    End
    Return parentAtts + atts
End
GetNestedClassLevelAttributes
Function GetNestedClassLevelAttributes(in pkg : Package) Returns String
    Set rslt := ''
    For each Class of pkg Do
        Set temp := GetAttributes(the Class, 'classifier')
        If Length(temp) > 0 Then
            If Length (rslt) > 0) Then
                Set rslt := rslt + '|'
            End
            Set temp := '(' + temp + ')'
        End
        Set rslt := rslt + temp
    End
    For Each Package of Pkg
        Set childAtts := GetNestedClassLevelAttributes(contained
        Package)
        If Length(childAtts) > 0 Then
            If Length(rslt) > 0 Then
                Set rslt := '(' + rslt + ')' + ','
```

-continued

Exhibit A

```
        End
            Set childAtts := '(' + childAtts + ')'
        End
        Set rslt := rslt + childAtts
    End
    Return rslt
End
GetPackageClasses
Function GetPackageClasses(in pkg : Package) Returns String
    If pkg has a parent or containing Package Then
        Set parentClasses := GetPackageClasses(parent Package)
    End
    Set classes := ''
    For Each Class of pkg Do
        Set Temp := Qualified name of the Class
        If Length(classes) > 0 Then
            Set classes := classes + '|'
        End
        Set classes := classes + Temp
    End
    If Length(parentClasses) > 0 and Length(classes) > 0) Then
        Set parentClasses := parentClasses + '|'
    End
    Return parentClasses + classes
End
GetContainedPackages
Function GetContainedPackages(in pkg:Package) Returns String
    If pkg has a parent Package Then
        Set parentPkgs := GetContainedPackages(parent Package)
    End
    Set pkgs := ''
    For Each (sub) Package of pkg Do
        Set Temp := Qualified name of the (sub) Package.
        If Length(pkgs) > 0 Then
            Set pkgs := pkgs + '|'
        End
        Set pkgs := pkgs + Temp
    End
    If Length(parentPkgs) > 0 and Length(pkgs) > 0) Then
        Set parentPkgs := pkgs + '|'
    End
    Return parentPkgs + pkgs
End
GetUnreferencedAssociations
Function GetUnreferencedAssociations(in pkg: Package) Returns String
    Set parentAssns := ''
    If pkg has a parent Package Then
        Set parentAssns := GetUnreferencedAssociations(parent
        Package)
    End
    Set assns := ''
    For each Association of pkg Do
        If isDerived is false Then
            If The Association has no References Then
                Set temp := qualified name of the Association
                If Length(assns) > 0) then
                    Set assns := assns + '|'
                End
                Set assns := assns + temp
            End
        End
    End
    If Length(parentAssns >0 ) and Length(assns) > 0) Then
        Set parentAssns := parentAssns + '|'
    End
    Return parentAssns + assns
End
```

What is claimed is:

1. In a software development framework having a repository and one or more software systems wherein said repository contains a meta-model and said software systems, which store instances of said meta-model, a method for enabling exchange of said instances of said meta-model among said software systems using a generalized data transfer language, said method comprising the steps of:

a. extracting a fixed component and a variable component of said meta-model;
b. parsing said variable component into a first set of constituent components for a first instance of said variable component;
c. extracting a list of repeated components from said first set of constituent components;
d. determining the hierarchical order and inheritance of said repeated components in said list of repeated components;
e. transforming said repeated components in said list of repeated components into corresponding components of a generalized software language;
f. transforming each of said first set of constituent components into corresponding components of said generalized software language;
g. transforming said first instance of variable component into corresponding components of said generalized software language;
h. repeating steps b to g for a second instance of said variable component;
i. transforming said fixed component into corresponding components of said generalized software language;
j. distributing said corresponding components to said second instance of said software model; and,
k. using said distributed said corresponding components to control the syntax of said generalized data transfer language to exchange said meta-model instances.

2. A method as in claim 1 wherein step d thereof further includes the step of transforming more than one of said repeated components into a single corresponding component.

3. The method as in claim 2 wherein said single corresponding component is an XML entity definition.

4. The method as in claim 1 wherein said meta-model is the Universal Modeling Language (UML).

5. The method as in claim 1 wherein said data transfer language is extensible Markup Language (XML).

6. The method as in claim 1 wherein said generalized software language is the Document Type Definition (DTD) specification language for XML.

7. The method as in claim 1 wherein said software systems are software modeling tools.

8. A method as in claim 1 wherein said meta-model is a meta-metamodel with instances that are themselves meta-models.

9. A method as in claim 1 further including facilitating exchange of said software model data between two software systems.

10. A storage medium for use in a software development framework having a repository and at least two software systems wherein said repository contains a meta-model and said software systems, which store instances of said meta-model, said medium encoded with machine-readable computer program code for enabling exchange of said instances of said meta-model among said software systems using a generalized data transfer language, wherein when the computer program code is executed by a computer, the computer performs the steps of:
a. extracting a fixed component and a variable component of said meta-model;
b. parsing said variable component into a first set of constituent components for a first instance of said variable component;
c. extracting a list of repeated components from said first set of constituent components;
d. determining the hierarchical order and inheritance of said repeated components in said list of repeated components;
e. transforming said repeated components in said list of repeated components into corresponding components of a generalized software language;
f. transforming each of said first set of constituent components into corresponding components of said generalized software language;
g. transforming said first instance of variable component into corresponding components of said generalized software language;
h. repeating steps b to g for a second instance of said variable component;
j. transforming said fixed component into corresponding components of said generalized software language;
l. distributing said corresponding components to said second instance of said software model; and,
m. using said distributed said corresponding components to control the syntax of said generalized data transfer language to exchange said meta-model instances.

11. A medium as in claim 10 wherein step d thereof further includes the step of transforming more than one of said repeated components into a single corresponding component.

12. The medium as in claim 11 wherein said single corresponding component is an XML entity definition.

13. The medium as in claim 10 wherein said meta-model is the Unified Modeling Language (UML).

14. The medium as in claim 10 wherein said data transfer language is extensible Markup Language (XML).

15. The medium as in claim 10 wherein said generalized software language is the Document Type Definition (DTD) specification language for XML.

16. The medium as in claim 10 wherein said software systems are software modeling tools.

17. A medium as in claim 10 wherein one of said instances of said meta-model is based on a software model.

18. A method as in claim 10 further including facilitating exchange of said software model data between two software systems.

19. In a software development framework having a repository and at least two software systems wherein said repository contains a meta-model and said software systems, which store instances of said meta-model, a method for enabling exchange of said instances of said meta-model among said software systems using a generalized data transfer language, said method comprising the steps of:
a. mapping primary objects of said meta-model to constructs of said generalized data transfer language;
b. mapping component parts and relationships of said primary meta-model objects to component constructs of said generalized data transfer language;
c. further mapping of groups of said relationships of said meta-model to aggregate constructs of said data transfer language;

d. mapping grouping mechanisms of said meta-model to grouping constructs of said generalized data transfer language;

e. defining algorithms for traversing said meta-model to obtain information about said component parts and relationships of said primary components necessary for preserving said information in a process of transforming said component parts and relationships, primary objects and grouping mechanisms into generalized software language components used to express said constructs, component constructs and grouping constructs of said generalized data transfer language;

f. defining algorithms for traversing said meta-model to obtain information about said groups of said relationships for the purpose of transforming said groups of said relationships into aggregate constructs of said generalized software language used to express said aggregate constructs of said generalized data transfer language;

g. defining algorithms for transforming groups of said relationships into generalized software language constructs used to express said aggregate constructs of said generalized data transfer language; and, h. expressing relationships among said generalized software language components, whereby reliable and correct programs to perform said transforming of said component parts and relationships, primary objects and grouping mechanisms into said generalized software language components can be written.

* * * * *